United States Patent
Trachewsky et al.

(10) Patent No.: US 8,804,685 B2
(45) Date of Patent: *Aug. 12, 2014

(54) DUAL MODE OPERATION IN A WIRELESS NETWORK

(71) Applicant: Broadcom Corporation, Irvine, CA (US)

(72) Inventors: Jason Trachewsky, Menlo Park, CA (US); Christopher Hansen, Los Altos, CA (US); Jeyhan Karaoguz, Irvine, CA (US); Saishankar Nandagopalan, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/038,178

(22) Filed: Sep. 26, 2013

(65) Prior Publication Data

US 2014/0022930 A1 Jan. 23, 2014

Related U.S. Application Data

(63) Continuation of application No. 13/484,623, filed on May 31, 2012, now Pat. No. 8,644,284, which is a continuation of application No. 12/402,118, filed on Mar. 11, 2009, now Pat. No. 8,213,395.

(60) Provisional application No. 61/051,526, filed on May 8, 2008, provisional application No. 61/035,694, filed on Mar. 11, 2008.

(51) Int. Cl.
*H04W 4/00* (2009.01)

(52) U.S. Cl.
USPC .............................. 370/338; 370/445

(58) Field of Classification Search
None
See application file for complete search history.

(56) References Cited

U.S. PATENT DOCUMENTS

| | | | |
|---|---|---|---|
| 6,751,199 B1 * | 6/2004 | Sindhushayana et al. | 370/252 |
| 6,873,611 B2 * | 3/2005 | Rios | 370/338 |
| 6,992,990 B2 * | 1/2006 | Sakusabe | 370/293 |
| 7,003,331 B2 * | 2/2006 | Cromer et al. | 455/574 |
| 7,899,018 B2 * | 3/2011 | Balasubramanian et al. | 370/338 |
| 2005/0220230 A1 * | 10/2005 | Fukuda | 375/343 |

* cited by examiner

*Primary Examiner* — Alex Skripnikov

(74) *Attorney, Agent, or Firm* — Garlick & Markison; Kevin L. Smith

(57) ABSTRACT

Provided is dual mode operation by a communicating device in wireless network. The communicating device selects a radio frequency (RF) channel and a physical layer type. The communicating device processes signals received via the selected RF channel based on the selected physical layer type. The communicating device may determine whether a beacon frame has been detected base on the signals that were received via the selected RF channel and processed based on the selected physical layer type. When a frame is not detected, the communicating device may determine a signal energy level for the received signals. The communicating device may establish an association with an existing network based on detection of the beacon frame or the communicating device may transmit an originating beacon frame based on the determined signal energy level.

20 Claims, 13 Drawing Sheets

DUAL MODE OPERATION IN A WIRELESS NETWORK

CROSS-REFERENCE TO RELATED APPLICATIONS

The present U.S. Utility Patent Application claims priority pursuant to 35 U.S.C. §120, as a continuation, to the following U.S. Utility patent application, which is hereby incorporated herein by reference in its entirety and made part of the present U.S. Utility Patent Application for all purposes:

1. U.S. Utility application Ser. No. 13/484,623, entitled "DUAL MODE OPERATION IN A WIRELESS NETWORK," filed May 31, 2012, issued as U.S. Pat. No. 8,644,284, on Feb. 4, 2014, which claims priority pursuant to 35 U.S.C. §120 as a continuation, to the following U.S. Utility Patent Application, which is hereby incorporated herein by reference in its entirety and made part of the present U.S. Utility Patent Application for all purposes:

2. U.S. Utility application Ser. No. 12/402,118, entitled "METHOD AND SYSTEM FOR DUAL MODE OPERATION IN WIRELESS NETWORKS," filed Mar. 11, 2009, now issued as U.S. Pat. No. 8,213,395, on Jul. 3, 2012, which claims priority pursuant to 35 U.S.C. §119(e) to the following U.S. Provisional Patent Applications, which are hereby incorporated herein by reference in their entirety and made part of the present U.S. Utility Patent Application for all purposes:

2.1. U.S. Provisional Application Ser. No. 61/035,694, entitled "METHOD AND SYSTEM FOR DUAL MODE OPERATION IN WIRELESS NETWORKS," filed Mar. 11, 2008, expired.

2.2. U.S. Provisional Application Ser. No. 61/051,526, entitled "METHOD AND SYSTEM FOR COMMON BURST FORMAT FOR OFDM AND SINGLE CARRIER MODULATION (SCM) MODES," filed May 8, 2008, expired.

TECHNICAL FIELD

Certain embodiments of the invention relate to wireless communication. More specifically, certain embodiments of the invention relate to a method and system for dual mode operation in wireless networks.

BACKGROUND

IEEE 802.15 describes a communication architecture, which may enable communicating devices (DEVs) to communicate via wireless personal area networks (WPANs). Many DEVs utilized in WPANs are small or handheld devices, such as personal digital assistants, portable computers, or consumer electronics devices such as digital video recorders or set top boxes. IEEE 802.15 is a short-range wireless communications standard that enables connection between consumer and computer equipment while eliminating wires. IEEE 802.15 WPAN DEVs may utilize frequencies in the 57 GHz to 66 GHz range for communication.

A plurality of communicating DEVs in a WPAN environment may comprise a network known as a piconet. One of the DEVs in a piconet may function as a piconet coordinator (or controller), or PNC. The PNC may provide overall coordination for the communication between DEVs in a piconet. The piconet may comprise the PNC and DEVs, which are associated with the PNC.

Communications between communicating DEVs in a WPAN may occur within time intervals referred to as superframes. The superframe may comprise a plurality of segments. In a first superframe segment, the PNC may transmit one or more beacon frames. The beacon frame may enable recipient DEVs to identify the PNC. The beacon frame may also enable recipient DEVs to identify other DEVs, which are currently associated with PNC within the piconet. In addition, a beacon frame may indicate time durations within the current superframe during which assigned DEVs may transmit and/or receive signals via a wireless communication medium. These time durations may be referred to as time slots. The time slot assignments may be in response to requests received from the DEVs during one or more previous superframes.

A second superframe segment may comprise a contention access period (CAP). The starting time instant and time duration of the CAP may be communicated within the preceding beacon frame. During the CAP, the DEVs may respond to the beacon frames by communicating with the PNC to establish an association within the piconet. Associations established during a current superframe may be reported via beacon frames in one or more subsequent superframes.

The DEVs within the piconet may also utilize the CAP to communicate data to other DEVs. Communicating DEVs may attempt to gain access to the wireless communication medium before attempting to transmit data. The collision sense multiple access with collision avoidance (CSMA/CA) protocol is typically utilized by communicating devices for wireless medium access. During the CAP, a DEV seeking medium access, an originating DEV, may transmit a request to send (RTS) frame. The RTS frame may be addressed to a destination DEV but the RTS frame may be received by other DEVs. The destination DEV may respond to the RTS frame by transmitting a clear to send (CTS) frame. The originating DEV and destination DEV may subsequently commence communication via the wireless medium. The communications may, for example, involve the transmission of data frames between the originating DEV and the destination DEV. Direct communications between an originating DEV and a destination DEV during the CAP are typically intermittent communications, which comprise relatively short time durations. In accordance with the CSMA/CA protocol, other DEVs that receive the RTS frame transmitted by the originating DEV may refrain from transmitting signals via the wireless medium during these communications. When an originating DEV seeks to reserve access to the wireless medium for longer time durations, the originating DEV may transmit an RTS frame to the PNC during the CAP. The PNC may respond to the originating RTS frame by sending an acknowledgment frame that comprises a time allocation slot.

A third superframe segment may comprise a channel time allocation (CTA) period. The CTA period may comprise one or more CTA time slots. During the CTA period, the PNC may assign and/or schedule a set of CTA time slots to one or more DEVs within the piconet. The PNC may communicate a time allocation slot to an assigned DEV during the CAP that identifies a specific CTA time slot. During the assigned CTA time slot the assigned DEV may be granted reserved access to the wireless communication medium. The assigned DEV may utilize the assigned CTA time slot to engage in communications with one or more destination DEVs. Other DEVs, which are not engaged in communications with the originating DEV, may refrain from transmitting signals via the wireless communication medium during the assigned CTA time slot. In conventional piconet systems, an individual CTA time slot is assigned to a single DEV. Thus, a single DEV may transmit signals via the wireless communication medium during a given CTA time slot.

The CTA period may also comprise a management CTA (MCTA) period. During the MCTA period, the DEVs may request CTA time slot assignments from the PNC. The PNC may respond to CTA time slot allocation requests received in the current superframe by making CTA time slot assignments for one or more subsequent superframes. The time slot assignments may be reported via beacon frames transmitted during the respective subsequent superframes.

The 57 GHz to 66 GHz frequency band may be utilized by different types of DEVs. The different types of DEVs may be utilized in connection with a variety of applications, which have different requirements.

The DEVs utilized in connection with digital video applications, for example video display, digital video recorder (DVR) and/or set top box (STB) devices may operate at data throughput rates that are in excess of 3 Gbps. Wireless communications between the video display, DVR and/or STB DEVs may involve transmission and reception of signals that traverse non line of sight (NLOS) signal propagation paths.

Portable computer and docking station DEVs may also operate at data throughput rates that are in excess of 3 Gbps. Wireless communications between portable computers and docking station DEVs may occur over line of sight (LOS) and/or NLOS signal propagation paths.

Hand-held DEVs may operate at data throughput rates that are in excess of 1 Gbps. The Hand-held DEVs may communicate wirelessly in connection with file sharing, sharing of digital audio content, digital video content and/or digital multimedia content, for example. Wireless communications between the hand-held devices typically occur over LOS signal propagation paths.

Wireless communications between hand-held and portable computer and/or network attached storage (NAS) DEVs may occur within the context of data synchronization applications. For example, a hand-held DEV may transmit data stored within the hand-held DEV to a personal computer DEV to enable data synchronization between the data stored in the hand-held DEV and the corresponding data stored in the personal computer DEV. The data stored in a personal computer or NAS DEV may then be accessed via a network. Wireless communications between hand-held DEVs and portable computer and/or NAS DEVs may involve data throughput rates that are in excess of 1 Gbps and typically occur over NLOS signal propagation paths.

Within a given DEV, applications may operate within the broader construct of a protocol reference model (PRM). The PRM may comprise a series of layers that enable communication between DEVs. For example, the PRM may comprise an application layer. The application layer within the PRM may correspond to a data source. Other layers within the PRM may cooperate with the application layer to partition the data from the data source into protocol data units (PDUs), for example, packets or frames, which comprise blocks of bits generated by the data source. At the physical (PHY) layer, signals may be generated that enable the data to be transmitted across a wired and/or wireless communication medium. The complexity of the operations performed by the PHY layer may be determined based on the application and corresponding requirements. Thus, different DEV types, which are utilized in connection with different applications, may comprise different levels of PHY complexity.

DETAILED DESCRIPTION OF THE DRAWINGS

Certain embodiments of the invention may be found in a method and system for dual mode operation in wireless networks. Various embodiments set out a hierarchical relationship among a plurality of piconets. At the base of the hierarchy is a parent piconet. From the parent piconet a plurality of dependent piconets may be defined. The parent piconet and each of the dependent piconets may comprise a distinct plurality of DEVs, which communicate within the respective piconet within the hierarchy. A piconet controller (PNC) may coordinate communications within the parent piconet and within each of the respective dependent piconets. The hierarchical piconet structure may enable sharing of RF channels between the DEVs within a parent piconet and DEVs within a dependent piconet while reducing the likelihood that the sharing of RF channels will impair the ability of DEVs within the parent piconet to communicate concurrently with communications between DEVs within the dependent piconet.

The piconet hierarchy may enable segregation of DEVs based on PHY complexity. Communicating DEVs within a parent piconet may utilize orthogonal frequency division multiplexing (OFDM), while communicating DEVs within a dependent piconet may utilize single carrier modulation (SCM). The segregation of the DEVs within the hierarchical piconet structure may enable sharing of RF channels between the DEVs within a parent piconet and DEVs within a dependent piconet. This may enable communicating DEVs in the parent piconet and in the dependent piconet to concurrently utilize the one or more common RF channels, while reducing the likelihood that the concurrent sharing of RF channels will impair communications between the DEVs within the parent piconet, which utilize an OFDM PHY, when there are also communications between the DEVs within the dependent piconet, which utilize an SCM PHY, for example, and vice versa.

Figure 1:
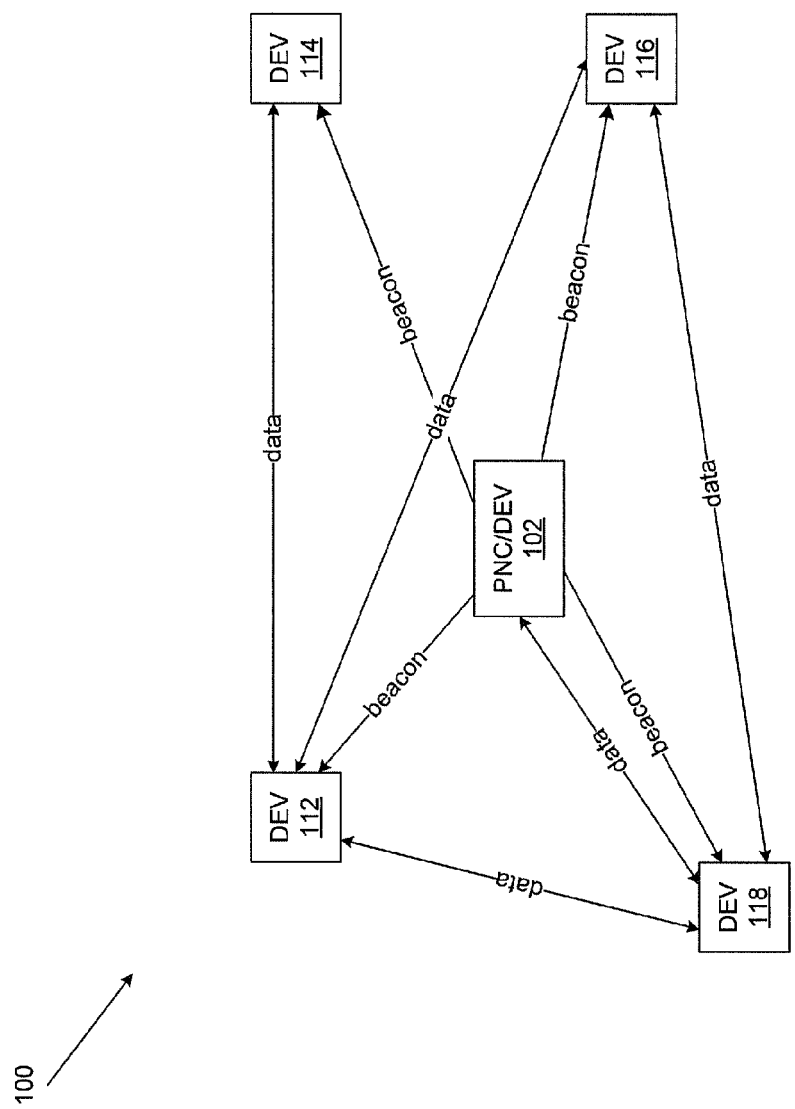
FIG. 1 is an exemplary wireless communication system, in accordance with an embodiment of the invention.

FIG. 1 is an exemplary wireless communication system, in accordance with an embodiment of the invention. Referring to FIG. 1, there is shown an exemplary piconet 100, which comprises a PNC 102 and a plurality of DEVs 112, 114, 116 and 118.

The PNC 102 may comprise suitable logic, circuitry, interfaces and/or code that may be operable to comprise DEV functionality. The PNC 102 may communicate beacon frames to each of the DEVs 112, 114, 116 and 118. The PNC 102 and any of the DEVs, for example, DEV 118, may communicate to exchange data.

Each of the plurality of DEVs 112, 114, 116 and 118 may comprise logic, circuitry, interfaces and/or code that may be operable to communicate with another DEV to exchange data, for example the DEV 112 and DEV 114, DEV 112 and DEV 116, the DEV 112 and DEV 118 and/or the DEV 116 and DEV 118, for example. Communications for data exchange between communicating DEVs within the piconet 100 may occur during the contention access period (CAP) within a superframe and/or during a channel time allocation (CTA) time slot, for example.

The DEV 114 and the DEV 116 may utilize an SCM PHY, while the PNC 102, DEV 112 and DEV 118 may utilize an SCM PHY and/or an OFDM PHY. In this regard, the DEV 114 and DEV 116 may be referred to as single mode DEVs while the PNC 102, DEV 112 and DEV 118 may be referred to as dual mode DEVs. The PNC 102 may utilize the SCM PHY when transmitting beacon frames. The PNC 102, DEV 112 and DEV 118 may utilize the SCM PHY when communicating with other DEVs within the piconet 100 during the CAP. The PNC 102, DEV 112 and DEV 118 may utilize the OFDM PHY when communicating with other DEVs within the piconet 100 during the CTA period. The DEV 114 and DEV 116 may utilize the SCM PHY when communicating with other DEVs within the piconet 100 during the CAP and during the CTA period.

A DEV that utilizes a given PHY may communicate with other DEVs within the piconet 100 that utilize the same PHY. For example, when the DEV 112 utilizes an SCM PHY, the DEV 112 may communicate: with the PNC 102 when the PNC 102 utilizes an SCM PHY; with the DEV 118 when DEV 118 utilizes an SCM PHY; with the DEV 114; and with the DEV 116. When the DEV 112 utilizes an OFDM PHY, the DEV 112 may communicate: with the PNC 102 when the PNC 102 utilizes an OFDM PHY; and with the DEV 118 when the DEV 118 utilizes an OFDM PHY.

The PNC 102, DEV 112 and DEV 118 may each utilize an SCM PHY during the beacon frame portion of a superframe and during the CAP portion of the superframe. By doing so, the PNC 102 may communicate with each of the DEVs 112, 114, 116 and 118 during the beacon frame and CAP portions of the superframe; the DEV 112 may receive beacon frames transmitted by the PNC 102 and may communicate with the PNC 102 and any of the DEVs 114, 116 and 118 during the CAP portion of the superframe; the DEV 118 may receive beacon frames transmitted by the PNC 102 and may communicate with the PNC 102 and any of the DEVs 112, 114 and 116 during the CAP portion of the superframe; DEV 114 may receive beacon frames transmitted by the PNC 102 and may communicate with the PNC 102 and any of the DEVs 112, 116 and 118 during the CAP portion of the superframe; and the DEV 116 may receive beacon frames transmitted by the PNC 102 and may communicate with the PNC 102 and any of the DEVs 112, 114 and 118 during the CAP portion of the superframe. However, during the CTA period, the DEV 112, the DEV 118 and the PNC 102 may utilize OFDM PHYs while DEV 114 and DEV 116 utilize SCM PHYs. This may enable, for example, the DEV 112 and DEV 118 to utilize a given RF channel, while concurrently DEV 114 and DEV 116 utilize the same RF channel. Because the DEV 112 and DEV 118 utilize a different PHY from that utilized by the DEV 114 and DEV 116, the likelihood is reduced that communications between the DEV 112 and DEV 118 may interfere with concurrent communications between the DEV 114 and DEV 116, and vice versa.

Figure 2:
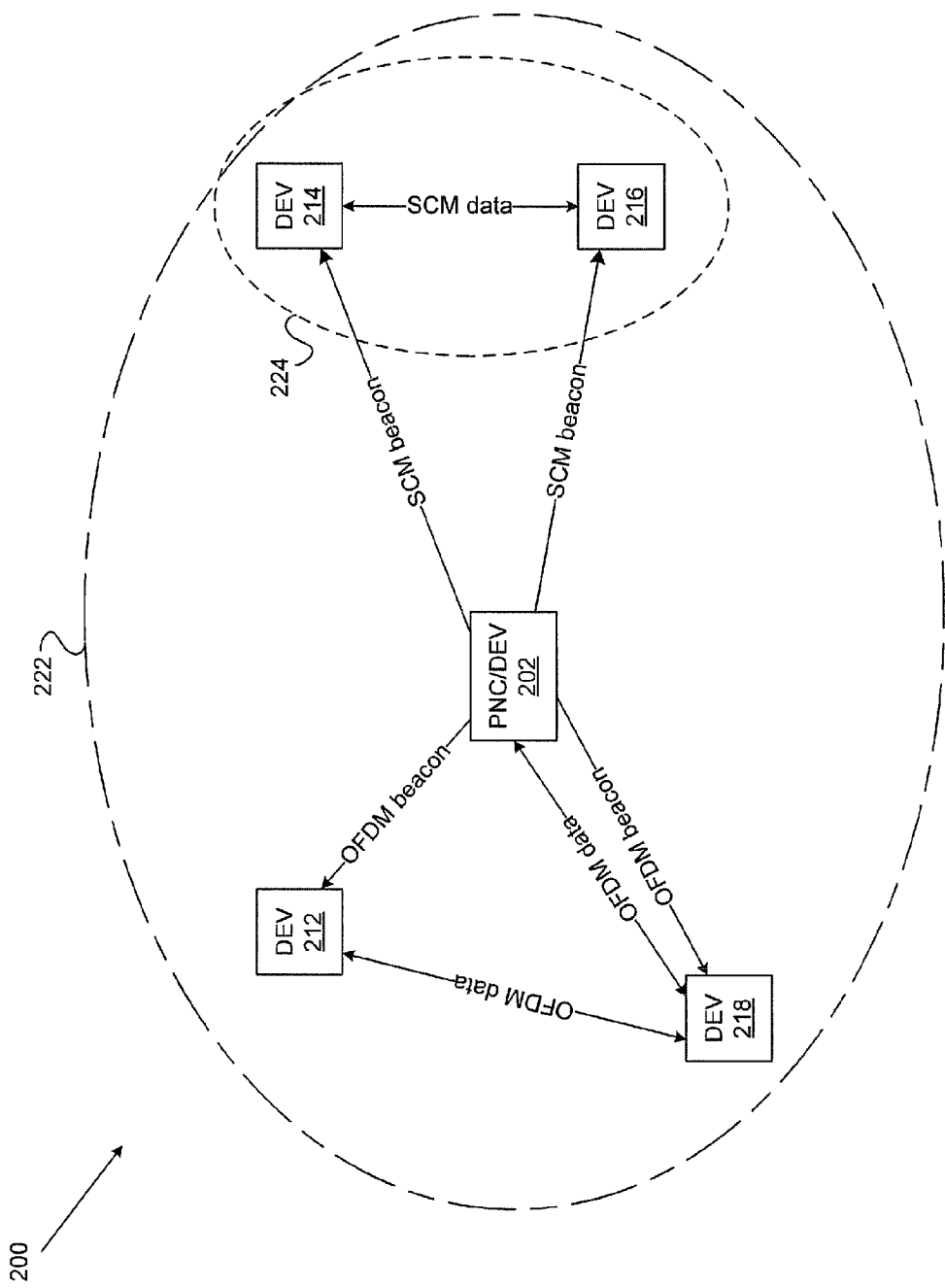
FIG. 2 is an exemplary hierarchical piconet structure, in accordance with an embodiment of the invention.

FIG. 2 is an exemplary hierarchical piconet structure, in accordance with an embodiment of the invention. Referring to FIG. 2, there is shown an exemplary hierarchical piconet 200. The hierarchical piconet 200 comprises a parent piconet 222 and a dependent piconet 224. The parent piconet 222 comprises a PNC 202 and a plurality of DEVs 212 and 218. The PNC 202 also comprises DEV functionality. The dependent piconet 224 comprises a plurality of DEVs 214 and 216. Communicating DEVs within the parent piconet 222 may utilize an RF channel k, which will be referred to as RF(k). Communicating DEVs within the dependent piconet 224 may also utilize the RF channel, RF(k).

The PNC 202 may utilize an SCM PHY and/or an OFDM PHY; the DEVs 212 and 218 may utilize OFDM PHYs and the DEVs 114 and 116 may utilize SCM PHYs. The PNC 202 may utilize a parent superframe in which one or more CTA time slots comprise a dependant superframe. For example, when the PNC 202 transmits a beacon frame for the parent superframe, or parent beacon frame, the parent beacon frame may identify the CTA time slot(s) that is assigned to the dependent superframe. The PNC 202 may preassign the CTA time slot(s), which are to be utilized for the dependent superframe. The parent beacon frame may also indicate the time instant at which the succeeding parent superframe will begin. The PNC 202 may utilize an OFDM PHY when transmitting the parent beacon frame. The DEV 212 and DEV 218 may be able to receive the parent beacon frame but the DEV 214 and DEV 216 may be unable to receive the parent beacon frame. Communications for data exchange may occur between the DEV 212 and DEV 218 during the CAP portion of the parent superframe and/or during assigned CTA time slots. Communications for data exchange may occur between the PNC 202 and DEV 212 and/or the DEV 218 during the CAP portion of the parent superframe and/or during CTA time slots within the parent superframe when the PNC 202 utilizes an OFDM PHY.

During the CTA time slot assigned to the dependent superframe the PNC 202 may transmit a beacon frame for the dependent superframe, or dependent beacon frame. The dependent beacon frame may communicate information that is relevant to the dependent superframe, for example, CTA time slot assignments within the dependent superframe. The dependent beacon frame may also indicate the time instant at which the succeeding dependent superframe will begin. The PNC 202 may utilize an SCM PHY when transmitting the dependent beacon frame. The DEV 214 and DEV 216 may be able to receive the dependent beacon frame but the DEV 212 and DEV 218 may be unable to receive the dependent beacon frame. Communications for data exchange may occur between the DEV 214 and DEV 216 during the CAP portion of the dependent superframe and/or during assigned CTA time slots. Communications for data exchange may occur between the PNC 202 and DEV 214 and/or DEV 216 during the CAP portion of the dependent superframe and/or during CTA time slots within the dependent superframe when the PNC 202 utilizes an SCM PHY.

Figure 3:
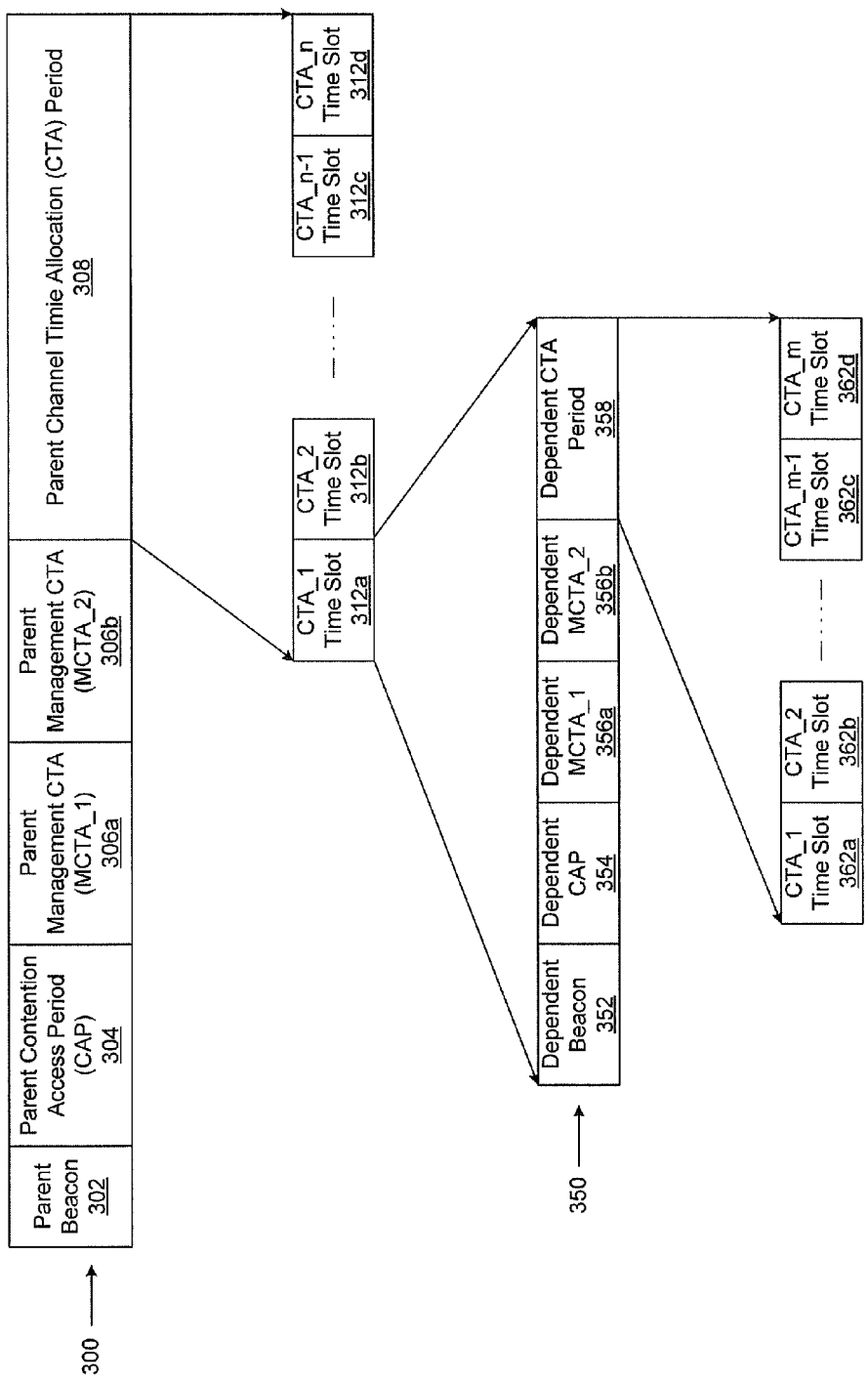
FIG. 3 is a diagram of an exemplary hierarchical superframe, in accordance with an embodiment of the invention.

FIG. 3 is a diagram of an exemplary hierarchical superframe, in accordance with an embodiment of the invention. Referring to FIG. 3, there is shown a parent superframe 300.

The parent superframe 300 may comprise a parent beacon 302, a parent CAP 304, a parent management channel time allocation time slot (MCTA_1) 306a, a parent MCTA_2 306b, and a parent channel time allocation (CTA) period 308. The parent CTA period 308 may comprise a plurality of n CTA time slots, CTA_1 312a, CTA_2 312b, . . . , CTA_n-1 312c and CTA_n 312d. A dependent superframe 350 may be assigned to CTA_1 312a. The dependent superframe 350 may comprise a dependent beacon frame 352, a dependent CAP 354, a dependent MCTA_1 356a, a dependent MCTA_2 356b and a dependent CTA period 358. The dependent CTA period 358 may comprise a plurality of m CTA time slots, CTA_1 362a, CTA_2 362b, . . . , CTA_m-1 362c and CTA_m 362d. During the parent CAP 304, DEVs may join the parent piconet 222. During the dependent CAP 354, the DEVs may join the dependent piconet 224.

The PNC 202 may transmit the parent beacon frame 302, via an RF channel RF(k), utilizing a PHY, which is utilized for transmitting signals within a parent piconet 222, for example an OFDM PHY. The PNC 202 may transmit the dependent beacon frame 352, via RF(k) utilizing a PHY, which is utilized for transmitting signals within a dependent piconet 224, for example an SCM PHY. The DEVs within the parent piconet 222, for example the DEV 212 and DEV 218, may communicate, via RF(k), utilizing an OFDM PHY during the parent CAP 304 and/or during assigned time slots within the parent CTA period 308, for example CTA_2 312b, . . . , CTA_n-1 312c and/or CTA_n 312d. The DEVs may join the parent piconet 222 during the parent CAP 304 by utilizing an OFDM PHY, for example. The DEVs within the dependent piconet 224, for example the DEV 214 and DEV 216, may communicate, via RF(k), utilizing an SCM PHY during the dependent CAP 354 and/or during assigned time slots within the dependent CTA period 358, for example CTA_1 362a, CTA_2 362b, . . . CTA_m-1 362c and/or CTA_m 362d. The DEVs may join the dependent piconet 224 during the dependent CAP 354 by utilizing an SCM PHY, for example.

One or more CTA time slots may be allocated within the parent CTA period 308 for dependent superframes 350 within each parent superframe 300. However, various embodiments may not be so limited. For example, one or more CTA time slots may be allocated within the parent CTA period 308 for dependent superframes 350 within every $j^{th}$ parent superframe 300. For example, where j=5, one or more CTA time slots within the parent CTA period 308 for dependent superframes 350 may be allocated within every $5^{th}$ parent superframe 300. The dependent beacon frame 352 may indicate a time instant at which the succeeding dependent superframe may begin. The time instant indicated within the dependent beacon frame 352 may be determined based on the parent superframe time duration, which may be indicated within the parent beacon frame 302.

The exemplary dependent superframe 352 comprises a dependent CAP 354. However, a dependent superframe 352 may or may not comprise a dependent CAP 354. For example, every $l^{th}$ dependent superframe may comprise a CAP 354. For example, where l=3, every $3^{rd}$ dependent superframe 352 may comprise a dependent CAP 354. Thus, opportunities to join the dependent piconet 224 may occur once in every three dependent superframes 352.

A DEV, for example DEV 212, may detect whether a channel, for example channel RF(k), is currently being utilized for signal transmissions by other DEVs, for example DEV 214. The DEV, for example DEV 212, which utilizes a given PHY, for example an OFDM PHY, may detect signal transmissions by other DEVs, which utilize OFDM PHYs for signal transmissions. The DEV, for example DEV 212, may also detect signal energy from signals transmitted by other DEVs. The DEV, for example DEV 212, may also utilize use information known about other PHY types to detect signal transmissions, which utilize the other PHY types. The known information may refer to stored information in the DEV. For example, a DEV 212, which utilizes an OFDM PHY, may have known information related to an SCM PHY type. Thus, DEV 212 may utilize the SCM PHY knowledge to detect when another DEV, for example DEV 214, is utilizing RF(k) for signal transmissions. DEV 212 may have known information that enables the DEV 212 to detect preamble information that is transmitted during SCM PHY signal transmissions, for example.

A DEV, which has been powered on but has not yet joined a piconet may be referred as making a "cold start". For example, when powered on, the DEV 212 may make a cold start. The cold start DEV 212 may select an RF channel, which the DEV 212 may utilize for communication with other DEVs within a piconet. The cold start DEV 212 may either join an existing piconet, for example piconet 222, or the cold start DEV 212 may establish a new piconet. In the latter case, the cold start DEV 212, which utilizes a PHY type, for example an OFDM PHY, may select an RF channel, RF(f), when no beacon frame transmissions have been detected via RF(f) by the cold start DEV 212 for a period of T time units (where T represents a number of time units, for example, milliseconds), when no frame transmissions utilizing an OFDM PHY for signal transmissions have been detected via RF(f) during the period of T time units and when no signal energy has been detected via RF(f) during the period of T time units. When the cold start DEV 212 is able to detect signal transmissions that utilize other PHY types, for example an SCM PHY, the cold start DEV 212 may also select RF(f) when no frame transmissions have been detected utilizing an SCM PHY for signal transmissions has been detected via RF(f) during the period of T time units.

A cold start DEV 212 may join an existing piconet by selecting an RF channel, for example RF(k), and detecting a beacon frame transmissions that utilize a PHY type utilized by the cold start DEV 212. For example, in a cold start DEV 212, which utilizes an OFDM PHY, the cold start DEV 212 may detect a transmitted parent beacon 302. In this case, the cold start DEV 212 may join the parent piconet 222. For a cold start DEV 212, which may utilize a plurality of DEV types, for example an SCM DEV and a OFDM DEV, the cold start DEV 212 may select a preferred PHY type, for example an SCM PHY, and attempt to detect beacon frame transmissions via RF(k), which utilize an SCM PHY. In this case, the cold start DEV 212 may join the dependent piconet 224.

A cold start DEV 212 may determine whether to start a new piconet or join an existing piconet based on a determination of the level of signal traffic that is observed at the cold start DEV 212 for a selected RF channel. For example, the cold start DEV 212 may initially attempt to join the parent piconet 222. In this case, the cold start DEV 212 may select RF(k) and attempt to determine the level of traffic observed via RF(k). The level of traffic may be determined based on identified frame transmissions and/or based on observed signal energy from signal transmissions via RF(k). In instances where the level of observed traffic is below a threshold value, $T_{thresh}$, the cold start DEV 212 may attempt to join the parent piconet 222. In instances where the level of observed traffic is greater than or equal to the threshold value $T_{thresh}$, the cold start DEV 212 may attempt to start a new piconet. In instances where the cold start DEV 212 utilizes an OFDM PHY but has no knowledge of other PHY types, for example SCM PHYs, the cold start DEV 212 may detect signal energy via RF(k). The cold start DEV 212 may identify the channel RF(k) as being an unusable RF channel. The cold start DEV 212 may select a subsequent RF channel, for example RF(f) and repeat the traffic level determination process.

Where the PNC 202 utilizes a single PHY type, or single mode PNC, the PNC 202 may allocate a determined number of CTA time slots within the parent CTA period 308 by inference. For example, in a single mode PNC, which utilizes an OFDM PHY, the PNC 202 may determine time instants when signal energy is detected via RF(k), but frame transmissions are not detected. During these time instants, the PNC 202 may determine that signal transmissions are occurring via RF(k), which utilize a PHY type other than an OFDM PHY, for example an SCM PHY. By detecting starting time instants and ending time instants for the detected signal energy via RF(k), the PNC 202 may determine time allocations within the parent CTA period 308 for signal transmission within the dependent piconet 224.

Figure 4:
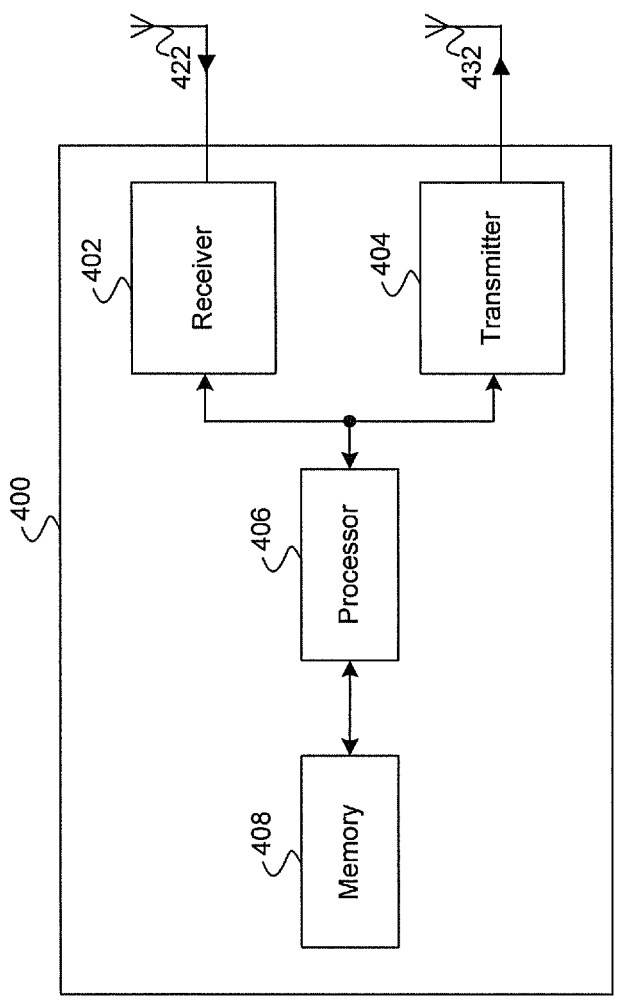
FIG. 4 is a diagram of an exemplary communicating device, which may be utilized in connection with an embodiment of the invention.

FIG. 4 is a diagram of an exemplary communicating device, which may be utilized in connection with an embodiment of the invention. Referring to FIG. 4, there is shown a transceiver system 400, a receiving antenna 422 and a transmitting antenna 432. The transceiver system 400 may be exemplary of the PNC 102 and/or of any of the DEVs 112, 114, 116 and/or 118. The transceiver system 400 may comprise at least a receiver 402, a transmitter 404, a processor 406, and a memory 408. Although a transceiver is shown in FIG. 4, transmit and receive functions may be separately implemented. The transceiver system 400 may comprise a plurality of transmitting antennas and/or a plurality of receiving antennas. Various embodiments may comprise a single antenna, which is coupled to the transmitter 404 and receiver 402 via a transmit and receive switch.

The receiver 402 may comprise suitable logic, circuitry, interfaces and/or code that may be operable to perform receiver functions that may comprise PHY layer function for the reception or signals. These PHY layer functions may comprise, but are not limited to, the amplification of received RF signals, generation of frequency carrier signals corresponding to selected RF channels, for example uplink or downlink channels, the down-conversion of the amplified RF signals by the generated frequency carrier signals, demodulation of data contained in data symbols based on application of a selected demodulation type, and detection of data contained in the demodulated signals. The RF signals may be received via the receiving antenna 422. The data may be communicated to the processor 406.

The transmitter 404 may comprise suitable logic, circuitry, interfaces and/or code that may be operable to perform transmitter functions that may comprise PHY layer function for the transmission or signals. These PHY layer functions may comprise, but are not limited to, modulation of received data to generate data symbols based on application of a selected modulation type, generation of frequency carrier signals corresponding to selected RF channels, for example uplink or downlink channels, the up-conversion of the data symbols by the generated frequency carrier signals, and the generation and amplification of RF signals. The data may be received from the processor 406. The RF signals may be transmitted via the transmitting antenna 432.

The memory 408 may comprise suitable logic, circuitry, interfaces and/or code that may enable storage and/or retrieval of data and/or code. The memory 408 may utilize any of a plurality of storage medium technologies, such as volatile memory, for example random access memory (RAM), and/or non-volatile memory, for example electrically erasable programmable read only memory (EEPROM). In the context of the present application, the memory 408 may enable storage of code selection of a PHY type, for selection of RF channels, for determination of received signal energy, for determination of received frames and for determination of time slot allocations. The memory 408 may also be utilized to store known information about a variety of physical layer types. For example, for a DEV which utilizes an OFDM PHY, the memory 408 may be utilized to store known information about other PHY types, such as SCM PHYs, for example.

In operation, the processor 406 may be operable to enable a PNC 202 to generate parent beacon frames 302 and dependent beacon frames 352. The processor 406 may be operable to determine CTA time slot assignments for communicating devices within a parent piconet 222 and for dependent superframes 350. The processor 406 may be operable to configure the transmitting 404 and/or receiver 402 to utilize an SCM PHY and/or an OFDM PHY. The processor 406 may be operable to enable a PNC 202 and/or a DEV 212 to perform a cold start procedure. The processor 406 may utilize data and/or code that is stored in the memory 408.

Figure 5:
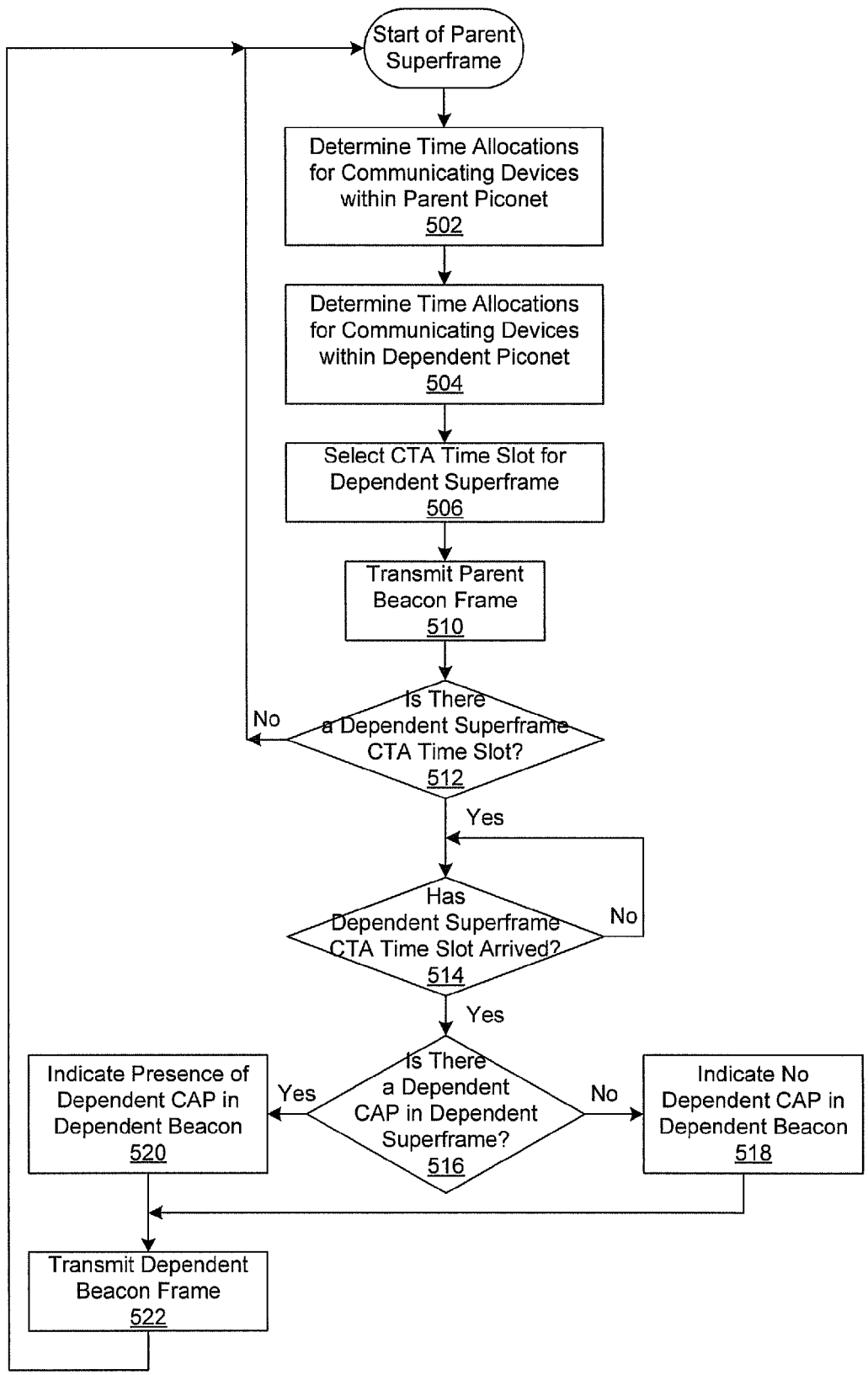
FIG. 5 is a flowchart that illustrates exemplary steps for beacon frame generation in a piconet controller, in accordance with an embodiment of the invention.

FIG. 5 is a flowchart that illustrates exemplary steps for beacon frame generation in a piconet controller, in accordance with an embodiment of the invention. Referring to FIG. 5, at the start of parent superframe, in step 502, the PNC 202 may determine time allocations for communicating DEVs within the parent piconet 222. The PNC 202 may determine time allocations for communicating DEVs within the parent piconet 222 based on CTA time slot requests received during a previous parent superframe. In step 504, the PNC 202 may determine time slot allocations for communicating DEVs within the dependent piconet 224. The PNC 202 may determine time slot allocations for communicating DEVs within the dependent piconet based on CTA time slot requests received during a previous dependent superframe and/or based on detected frame transmissions from communicating DEVs within the dependent piconet 224 and/or based on signal energy detected when frame transmissions are not detected. In step 506, the PNC 202 may select a CTA time slot, CTA_1 312*a*, within the parent CTA period 308 for the dependent superframe 350. In instances in which the PNC 202 allocates a CTA time slot for the dependent superframe in every $j^{th}$ parent superframe, the PNC 202 may select a CTA time slot for the dependent superframe 350 based on whether the current parent superframe is a $j^{th}$ parent superframe. In step 510, the PNC 202 may transmit the parent beacon frame 302. The parent beacon frame 302 may indicate the CTA time slot (if any), which has been allocated within the parent CTA period 308 for the dependent superframe 350. The PNC 202 may utilize an OFDM PHY to transmit the parent beacon frame 302 via RF channel RF(k).

In step 512, the PNC 202 may determine whether there is a CTA time slot allocation in the parent CTA period 308 for a dependent superframe 350 within the current parent superframe 300. In instances in which there is no allocated parent CTA time slot allocation, for purposes of the present figure, the process returns to the start of parent superframe node in anticipation of the succeeding parent superframe 300.

In instances in which it is determined at step 512 that there is an allocated CTA time slot for a dependent superframe 350, in step 514, the PNC 202 may determine whether the beginning time instant for the assigned CTA time slot, CTA_1 312*a*, has arrived. In instances in which the beginning time instant has not arrived, for purposes of the present figure, the process waits at step 514.

In instances in which it is determined at step 514 that the beginning time instant for the CTA_1 312*a* time slot has arrived, in step 516, the PNC 202 may determine whether the present dependent superframe 350 comprises a dependent CAP 354. In instances in which the PNC 202 allocates a dependent CAP 354 in every $1^{th}$ dependent superframe, the PNC 202 may make the determination based on whether the current dependent superframe is an $1^{th}$ dependent superframe. In instances in which the PNC 202 determines that no dependent CAP is to be allocated in the current dependent superframe, in step 518, the PNC 202 may indicate in a dependent beacon frame that the current dependent superframe does not comprise a dependent CAP 354.

In instances in which it is determined at step 516 that there is a dependent CAP 354 in the current dependent superframe, the PNC 202 may indicate in a dependent beacon frame that the current dependent superframe comprises a dependent CAP 354. In step 522, the PNC 202 may transmit the dependent beacon frame 352. The PNC 202 may utilize an SCM PHY to transmit the dependent beacon frame 352 via RF channel RF(k).

Figure 6:
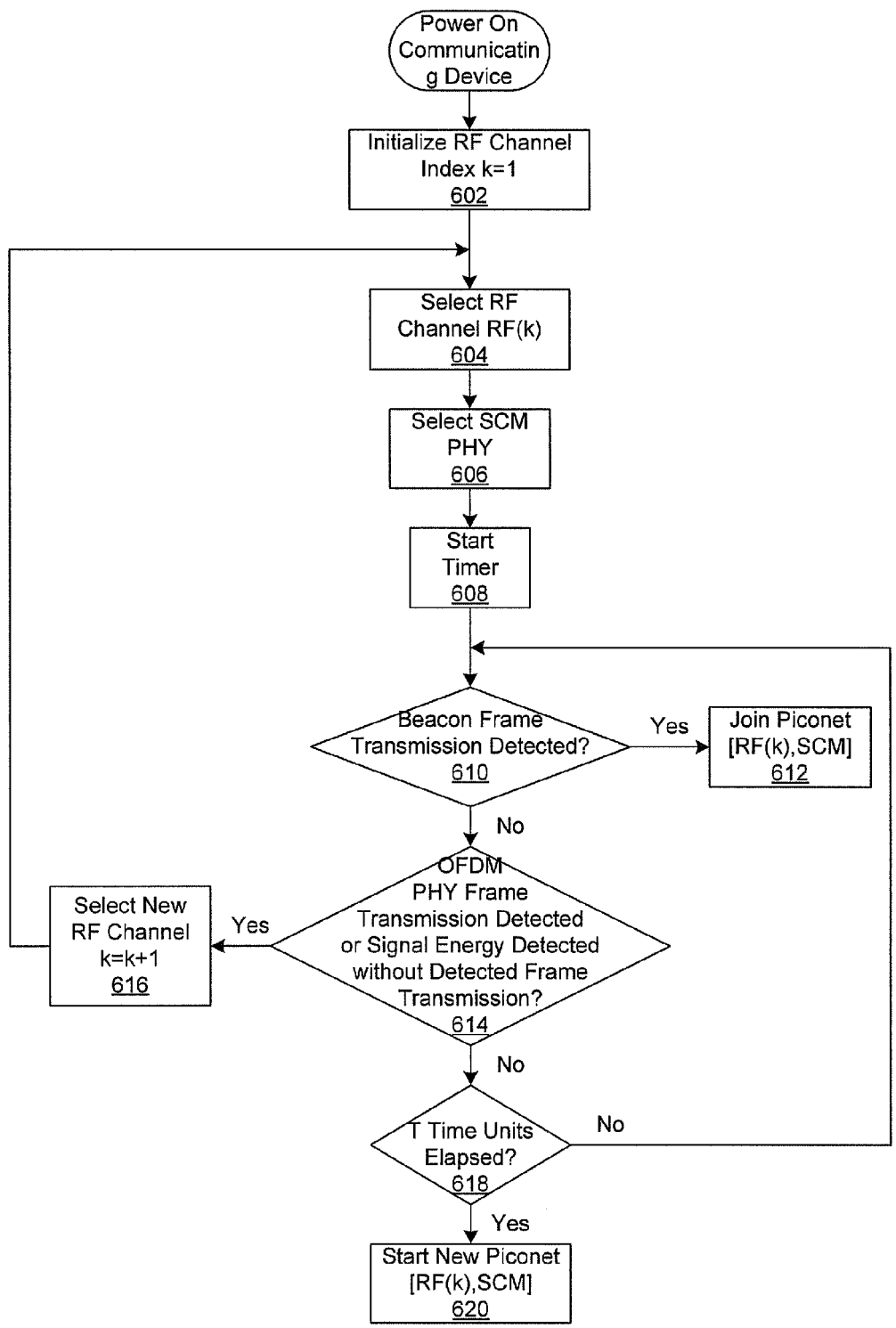
FIG. 6 is a flowchart that illustrates exemplary steps for cold start of a communicating device, in accordance with an embodiment of the invention.

FIG. 6 is a flowchart that illustrates exemplary steps for cold start operation of a communicating device, in accordance with an embodiment of the invention. The flowchart presented in FIG. 6 illustrates exemplary steps for a DEV 114 or DEV 116 within a dependent piconet 224, but the cold start procedure presented in FIG. 6 may be similarly applied for a DEV 112 or DEV 118 within a parent piconet 222. Referring to FIG. 6, after a cold start DEV has been powered on, in step 602, the cold start DEV may initialize an RF channel index, k=1. For purposes of the current figure, the RF channel index may be utilized as an index for selection of an RF channel. In step 604, the cold start DEV may select an RF channel, RF(k), based on the current RF channel index value k. In step 606, the cold start DEV may select an SCM PHY type. The selected PHY type may be utilized by the cold start DEV for transmission and/or reception of signals. In step 608, the cold start DEV may start a timer. The timer may determine the time duration for the cold start process. In step 610, the cold start DEV may determine whether a beacon frame transmission has been detected. In instances in which a beacon frame transmission has been detected in step 610, in step 612, the cold start DEV may join an existing piconet [RF(k),SCM]. The cold start DEV may establish an association with the existing piconet by joining the existing piconet. The cold start DEV may join an existing piconet by communicating with a coordinating communication DEV, such as a PNC 202, which are currently associated with the existing piconet. Joining the existing piconet may enable the cold start DEV to communicate with other communicating DEVs and/or coordinating communication DEVs that are associated with the existing piconet. These DEVs may be referred to as being members of the existing piconet. When communicating with other DEVs that are members of the existing piconet, the cold start DEV may utilize RF channel RF(k) and an SCM PHY type.

In instances in which a beacon frame transmission has not been detected in step 610, in step 614, the cold start DEV may determine whether frame transmission utilizing an OFDM PHY has been detected. The cold start DEV may determine that a frame transmission has occurred via RF(k) utilizing an OFDM PHY based on known information at the cold start DEV, which is related to OFDM PHY signal transmission. In step 614, the cold start DEV may also determine whether signal energy has been detected even though no frame transmission has been detected. In this case, the cold start DEV may detect signal energy but may not be able to determine the PHY type utilized for the signal transmission. In instances in which a cold start DEV has detected OFDM PHY frame transmission or has detected signal energy without detecting frame transmission in step 614, in step 616, the cold start DEV may modify the RF channel index k. The RF channel index modification may enable the cold start DEV to select a new RF channel. Step 604 may follow step 614.

In instances in which a cold start DEV has not detected OFDM PHY frame transmission nor has detected signal energy without detecting frame transmission in step 614, in step 618, the cold start DEV may determine whether T time units has elapsed since the start of the time in step 608. In instances in which T time units has not elapsed in step 618, step 610 may follow step 618. In instances in which T time units has elapsed in step 618, in step 620, the cold start DEV may start a new piconet [RF(k),SCM]. The cold start DEV may start the new piconet by transmitting an originating beacon frame via a selected RF(k) channel. The cold start DEV may also perform a coordinating communication DEV role in the new piconet. Communicating devices, which join the new piconet may utilize RF channel RF(k) and an SCM PHY type.

A frame may be referred to as a protocol data unit (PDU). An exemplary PDU is a beacon frame. Other types of frames, packets and/or messages may also be referred to as PDUs. For example, data communications between communicating DEVs within a piconet may involve the transmission of PDUs from an originating DEV to a destination DEV. The transmitted PDUs may comprise the data being transferred during the data communications between the communicating DEVs.

A piconet may be referred to as a network. For example, a parent piconet may be referred to as a parent network while a dependent piconet may be referred to as a dependent network. Thus, various embodiments of the invention may not be limited to communications between communicating devices within a piconet, but embodiments may also be practiced between communicating devices in a variety of networks, such as wireless local area networks (WLAN), for example.

Another embodiment of the invention may provide a machine and/or computer readable medium, having stored thereon, a computer program having at least one code section executable by a machine and/or computer, thereby causing the machine and/or computer to perform the steps as described herein for dual mode operation in wireless networks.

Various embodiments of the invention may comprise a method and system for generating contents of protocol data units (PDUs), which are transmitted by communicating DEVs. The contents of the PDUs may be transmitted via signals, which may collectively be referred to as a "burst".

Figure 7:
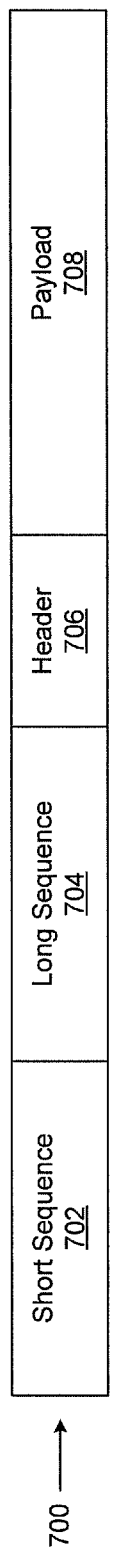
FIG. 7 is a diagram of an exemplary protocol data unit, which may be utilized in connection with an embodiment of the invention.

FIG. 7 is a diagram of an exemplary protocol data unit, which may be utilized in connection with an embodiment of the invention. Referring to FIG. 7, there is shown a PDU 700. The PDU 700 may comprise a short sequence field 702, a long sequence field 704, a header field 706 and a payload field 708. The PDU 700 format may be specified in a physical (PHY) layer specification, for example such as a PHY level specification for IEEE 802.11 wireless LAN systems.

In IEEE 802.11 WLAN systems, the short sequence field 702 may be referred to as short training sequence and the long sequence field 704 may be referred to as a long training sequence. A preamble field may comprise the short training sequence and the long training sequence. The header field 706 may comprise a SIGNAL field.

The short sequence field 702 may enable signal detection and automatic gain control (AGC) level setting at a receiving DEV. Signal detection, also referred to as burst acquisition, may enable the receiving DEV to determine the presence of transmitted signal energy in a communication medium. AGC level setting may enable a receiver 402 to set a gain level for amplification of received signals. The short sequence field 702 may also enable course frequency tuning and timing synchronization at the receiving DEV. The course frequency tuning and timing synchronization may enable the receiving DEV to determine an approximate frequency for the received signal and to synchronize an internal clock to receive data contained in the received PDU.

The long sequence field 704 may enable fine frequency tuning at the receiving DEV. The fine frequency turning may enable the receiving DEV to determine an RF channel that is to be utilized for receipt of signals.

The header field 706 may comprise information that specifies the length of the payload field 708, for example as measured in units of octets. The header field 706 may also comprise a modulation and coding scheme (MCS) field, which identifies a modulation type and/or coding type utilized for encoding data within the payload field 708.

The payload field 708 may comprise data that are to be received and/or processed by the receiving DEV. The data contained within the payload field 708 may be encoded based on an MCS as specified in the header field 706. The payload field 708 may also comprise data that has been encoded utilizing an inner and/or outer forward error correction (FEC) coding scheme.

The short sequence field 702, long sequence field 704, header field 706 and/or payload field 708 may be received at the receiving DEV via signals that are transmitted via a communication medium and received via a receiving antenna 422. The signals received via the receiving antenna 422 may be processed by a receiver 402. The receiver 402 may perform PHY layer processing on the received signal to decode the signals and generate bits, which correspond to the short sequence field 702, long sequence field 704, header field 706 and/or payload field 708, respectively. For example, the receiver 402 may receive a plurality of signal levels at various time instants. Each of the received signal levels may correspond to a chip. In other embodiments, each of the received signal levels may correspond to a symbol.

In instances, in which each of the received signal levels corresponds to a chip, the receiver 402 may utilize a despreading algorithm, which converts a plurality of chips to a corresponding symbol. The number of chips, which correspond to a single symbol, may be determined based on a spreading factor.

In instances, in which each of the received signal levels corresponds to a symbol, the receiver 402 may utilize a constellation map to convert each symbol into one or more bits. The constellation map may be determined based on a modulation type. The number of bits, which correspond to a single symbol, may be determined based on the modulation type.

A π/2-BPSK (binary phase shift keying) modulation type may be utilized by the receiver 402 for PHY layer processing of signals, which correspond to one or more of the short sequence field 702, long sequence field 704, the header field 706 and/or the payload field 708. A transmitter 404 may receive a plurality of input bits, $b_{in,m}$, where m represents an $m^{th}$ bit among the plurality of bits. Based on the bits, $b_{in,m}$, symbols may be generated at the transmitter 404 utilizing π/2-BPSK by generating a plurality of symbols utilizing BPSK, where k represents a $k^{th}$ symbol among the plurality of symbols and phase shifting each successive BPSK symbol, $s_{in,k}$, by a phase rotation of π/2. The plurality of it/2-BPSK symbols, $s_{out,k}$, may be represented as shown in the following equation:

$$s_{out,k} = s_{in,k} * e^{j\pi k/2} \quad [1]$$

where $j=\sqrt{-1}$ and k=0, 1, . . . . In instances, where BPSK modulation is utilized, the number of symbols, $s_{in,k}$, may be equal to the number of bits, $b_{in,m}$.

The receiver 402, which receives signals comprising π/2-BPSK symbols, may generate a plurality of output bits, $b_{out,m}$, based on equation [1] and the constellation map for the BPSK modulation type. The output bits, $b_{out,m}$, generated at the receiver 402 may comprise estimated values for the input bits, $b_{in,m}$, generated at the transmitter 404 as represented in the following equation:

$$b_{out,m} = \hat{b}_{in,m} \quad [2]$$

Figure 8:
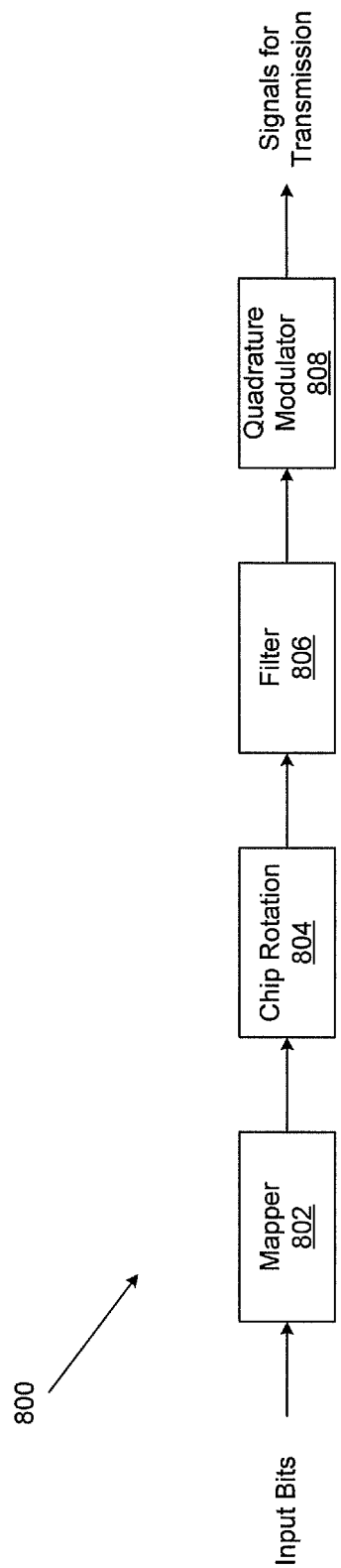
FIG. 8 is a block diagram of an exemplary transmitter, in accordance with an embodiment of the invention.

FIG. 8 is a block diagram of an exemplary transmitter, in accordance with an embodiment of the invention. Referring to FIG. 8, there is shown a transmitter 800. The transmitter 800 may comprise a mapper 802, a chip rotation block 804, a filter block 806 and a quadrature modulator 808. The mapper 802 may receive a plurality of input bits, $b_{in,m}$. The mapper 802 may comprise suitable logic, circuitry and/or code that are operable to utilize a BPSK modulation type to generate a plurality of symbols, $s_{in,k}$. The chip rotation block 804 may comprise suitable logic circuitry and/or code that are operable to receive the plurality of symbols, $s_{in,k}$, and generate a corresponding plurality of phase rotated symbols, $s_{out,k}$, as represented in equation [1]. The chip rotation block 804 may utilize a spreading algorithm to generate a plurality of chips based on each phase rotated symbol, $s_{out,k}$. The filter block 806 may comprise suitable logic, circuitry and/or code that are operable to perform low pass filtering on the output signal from the chip rotation block 804. The filter block 806 may output a filtered signal, which is input to the quadrature modulator 808. The quadrature modulator 808 may comprise suitable logic, circuitry and/or code as may commonly be found in quadrature modulator circuits.

The mapper 802 may utilize other modulation types. For example, the mapper 802 may utilize quaternary phase shift keying (QPSK) when generating symbols.

The short sequence field 702 may comprise a repeated chip sequence. The chip sequence may comprise a 128-chip Golay code sequence, $c_n$, where n indicates a distinct 128-chip Golay code sequence among a plurality of N distinct Golay code sequences. In an exemplary embodiment, N=4. Correspondingly, there may be four distinct Golay code sequences: $c_0$, $c_1$, $c_2$ and $c_3$. Chips within each Golay code sequence may be encoded utilizing a π/2-BPSK constellation map.

Communicating DEVs within a given piconet may select distinct Golay code sequence, $c_n$. The selected Golay code sequence may then be utilized in a repeated sequence within the short sequence field 702 for PDUs transmitted within the piconet. For example, communicating DEVs within the parent piconet 222 may utilize Golay code sequence $c_0$ while communicating DEVs within the dependent piconet 224 may utilize Golay code sequence $c_1$. Thus, PDUs transmitted by DEV 112 may comprise a short sequence field 702, which comprises a repeated chip sequence based on Golay code sequence $c_0$, while PDUs transmitted by DEV 114 may comprise a short sequence field 702, which comprises a repeated chip sequence based on Golay code sequence $c_1$.

The number of repetitions of the selected Golay code sequence may be determined based on a length of the short sequence field 702. In an exemplary short length version of the short sequence field 702, the selected Golay code sequence, $c_n$, may be repeated eight times, wherein the last two repetitions may comprise a negated version of the Golay code sequence, $-c_n$, as shown below:

$$\text{Short\_Sequence\_Field(Short)} = c_n, c_n, c_n, c_n, c_n, c_n, -c_n, -c_n \quad [3]$$

where $-c_n$ may represent a two's complement representation, or one's complement representation, of $c_n$. In an exemplary medium length version of the short sequence field 702, the selected Golay code sequence, $c_n$, may be repeated sixteen times, wherein the last four repetitions may comprise $-c_n$. In an exemplary long length version of the short sequence field 702, $c_n$ may be repeated forty times, wherein the last eight repetitions may comprise $-c_n$.

In an embodiment, the long sequence field 704 may comprise a pair of complementary Golay code sequences: Seq_a, Seq_b. Each of the Golay code sequences, Seq_a and Seq_b, may comprise a 512-chip Golay code sequence, wherein the 512-chip Golay code sequence, Seq_a, is a complementary to the 512-chip Golay code sequence, Seq_b. Chips within each Golay code sequence, Seq_a, Seq_b, may be encoded utilizing a π/2-BPSK constellation map. In another example, chips within each Golay code sequence, Seq_a, Seq_b, may be encoded utilizing a BPSK constellation map. Other constellation maps may be utilized, for example, QPSK and/or π/2-QPSK.

A long sequence field 704 may be represented as shown below:

$$\text{Long\_Sequence\_Field} = G, a_{384,\ldots,511}, \text{Seq\_}a, G, b_{384,\ldots,511}, \text{Seq\_}b \quad [4]$$

where $a_{384}, \ldots, 511$ represents a 128-chip cyclic prefix that precedes Golay code sequence Seq_a and $b_{384}, \ldots, 511$ represents a 128-chip cyclic prefix that precedes Golay code sequence Seq_b and G represents a guard interval.

The long sequence field 704 may comprise repeated Golay code sequences Seq_a and Seq_b as shown below:

$$\text{Long\_Sequence\_Field} = a_{384,\ldots,511}, \text{Seq\_}a, \ldots, \text{Seq\_}a, b_{384,\ldots,511}, \text{Seq\_}b, \ldots, \text{Seq\_}b \quad [5]$$

The receiver 402, which receives PDUs, may utilize a received long sequence field 704 to compute channel estimate values, $\hat{h}_n$. The computed channel estimate values may characterize the communication medium through which the received signals have propagated. Based on the computed channel estimate values, the receiver may compute estimated bit values, $\hat{b}_{in,m}$ for data bits in the payload field 708.

Signals received at the receiver 402 during the long sequence field 704 portion of the received PDU 700 may comprise a plurality of chips. A portion of the received chips may correspond to chip sequences Seq_a and Seq_b respectively. The chips corresponding to Seq_a may be referred to as $a_k$, while the chips corresponding to Seq_b may be referred to as $b_k$. A plurality of symbol values, $x_k$, may be computed based on the received chips from sequences Seq_a and Seq_b respectively as shown in the following equation:

$$x_k = \sum_{n=0}^{v} h_n \cdot c_{k-n} + n_k \quad [6]$$

where $h_n \cdot c_{k-n}$ represents values in a received chip sequence, $c_k$ represents the corresponding values in a chip sequence (for example, $c_k = a_k$ or sequence $c_k = b_k$) at the transmitter, $h_n$ represents the impulse response of the communication medium (the value of which is estimated by the channel estimate $\hat{h}_n$), $n_k$ represents channel noise and u represents the number of chips that correspond to a symbol.

The values of the received chips may differ in relation to the corresponding chip values in the sequences, $a_k$ and $b_k$, based on channel impulse response values $h_n$. These differences result from the propagation of the signals across the communication medium and represent a form of signal distortion referred to as fading. Fading may result in magnitude and/or phase distortion in transmitted signals. Since the chip sequences $a_k$ and $b_k$ are typically known among communicating DEVs within a given piconet, the receiver 402 may compute channel estimate values, $\hat{h}_n$, based on the known chip sequence, $a_k$, the known chip sequence, $b_k$, and the values of the received chips.

For a Golay sequence $a_k$, computed symbol values $x_k$ may be determined as shown in the following equation:

$$x_k = \sum_{n=0}^{v} h_n \cdot a_{(k-L_{guard}-n) \bmod L} + n_k, \quad [7]$$

$$\text{for } k = L_{guard}, \ldots, L_{guard} + L - 1$$

where $L_{guard}$ represents a duration for a guard interval (for example the guard interval may represent the length of the cyclic prefix $a_{384\ldots511}$), L represents the number of points in a discrete Fourier transform (DFT) algorithm. In equation [7], the index for chips $a_k$ is computed for a modulus base of $L_{guard}$. In an exemplary embodiment, L=512.

For a Golay sequence Seq_b, computed values $x_k$ may be determined as shown in the following equation:

$$x_k = \sum_{n=0}^{v} h_n \cdot b_{(k-2L_{guard}-n) \bmod L} + n_k, \quad [8]$$

$$\text{for } k = 2 \cdot L_{guard} + L, \ldots, 2 \cdot (L_{guard} + L) - 1$$

Based on the computed symbol values $x_k$ in equations [7] and [8], corresponding L-point DFT values may be computed respectively as shown in the following equations:

$$X_{0,m} = \sum_{k=L_{guard}}^{L_{guard}+L-1} x_k \cdot e^{i\frac{2\pi(k-L_{guard})}{L}} \quad [9]$$

$$X_{1,m} = \sum_{k=2L_{guard}+L}^{2(L_{guard}+L)-1} x_k \cdot e^{i\frac{2\pi(k-2L_{guard}-L)}{L}} \quad [10]$$

Based on the chip sequences, $a_k$ and $b_k$, corresponding L-point DFT values may be computed respectively as shown in the following equations:

$$\hat{B}_m = \sum_{k=0}^{L-1} b_{L-k-1} \cdot e^{i\left(\frac{2\pi k}{L}\right)} \quad [12]$$

The properties of the Golay chip sequences, $a_k$ and $b_k$, may be characterized as shown in the following equations:

$$\rho_a(k) = \sum_{n=0}^{L-K-1} a_n \cdot a_{n+k} \quad [13a]$$

-continued $$\rho_b(k) = \sum_{n=0}^{L-K-1} b_n \cdot b_{n+k} \quad [13b]$$

$$\rho_a(k) + \rho_b(k) = \begin{cases} 0, k = 1 \ldots L-1 \\ 2 \cdot L, k = 0 \end{cases} \quad [13a]$$

Based on the DFT values computed in equations [9]-[12] a correlation value may be computed as shown in the following equation:

$$\hat{H}_m = \frac{X_{0,m} \cdot \tilde{A}_m + X_{1,m} \cdot \tilde{B}_m}{2 \cdot L} \quad [14]$$

Channel estimate values, $\hat{h}_n$, may be computed based on L-point DFT values computed from the correlation values $\hat{H}_m$ as shown in the following equation:

$$\hat{h}_n = \sum_{m=0}^{L-1} \hat{H}_m \cdot e^{-i(2\pi m/L)} \quad [15]$$

Symbols within the header field 706 may be encoded based on any of a plurality of modulation types, for example, BPSK, π/2-BPSK, QPSK or π/2-QPSK. The header field 706 may also comprise a guard interval. The guard interval within the header field 706 may comprise 64 chips. The symbols within the header field 706 may be generated based on encoded bits. The encoded bits may be encoded based on inner forward error correction coding (FEC), for example. The inner FEC may be based on low density parity check (LDPC) coding. The coding rate, r, for the LDPC may be represented r=½. Chips may be generated based on the symbols based on a spreading factor of 2 times (2×) or 4 times (4×), for example.

The header field 706 may comprise a Length field. The Length field may comprise a plurality of bits, for example 20 bits, which indicate the length of at least a portion of the PDU 700. The Length field indicates the length of the payload field 708. The Length field may indicate the PDU length in units of octets, for example. The header field 706 may comprise an MCS field, which indicates the modulation and coding scheme (MCS), which is utilized for encoding at least a portion of the bits in the PDU 700. The MCS field may comprise a plurality of bits, for example, 8 bits, which indicates a modulation type and/or coding rate, which is utilized for encoding bits in the payload field 708. The MCS field may indicate when at least a portion of the bits within the PDU 700 are encoded and transmitted utilizing π/2-BPSK and single carrier modulation (SCM), when at least a portion of the bits within the PDU 700 are encoded and transmitted utilizing BPSK and SCM or when at least a portion of the bits within the PDU 700 are encoded and transmitted utilizing orthogonal frequency division multiplexing (OFDM), for example.

The header field 706 may comprise a guard interval duration field, which indicates the length, in units of chips, for example, for a guard interval. The guard interval duration field may comprise a single bit. Notwithstanding, one or more bits may be utilized to specify the guard interval duration.

The header field 706 may comprise a number of spatial streams (NSS) field, which indicates the number of spatial streams utilized by a transmitting DEV. In various embodiments, the NSS field may be utilized in connection with multiple input, multiple output (MIMO) communication systems. The NSS field may comprise 2 bits. Notwithstanding, one or more bits may be utilized to specify the number of spatial streams utilized by a transmitting DEV.

The header field 706 may comprise a preamble type field. The preamble type field may indicate the length of the short sequence field 702 portion of the PDU. The preamble type field may comprise 2 or more bits. One distinct 2-bit value may indicate that the succeeding PDU 700 may comprise a short length version of the short sequence field 702, another distinct 2-bit value may indicate that the succeeding PDU 700 may comprise a medium length version of the short sequence field 702 and another distinct 2-bit value may indicate that the succeeding PDU 700 may comprise a long length version of the short sequence field 702.

The header field 706 may comprise an aggregation field, a scrambler initialization field, a header check sequence field and various reserved bits. Each of these fields may operate substantially as described in various communication standards documents, such as in one or more IEEE 802 specifications, for example.

In various embodiments, symbols within the payload field 708 may be encoded based on any of a plurality of modulation types, for example, BPSK, π/2-BPSK, QPSK, π/2-QPSK or OFDM. The payload field 708 may also comprise one or more guard intervals. In one aspect, the guard interval(s) within the payload field 708 may comprise 64 chips. In another aspect, the symbols within the payload field 708 may be generated based on encoded bits. The encoded bits may be encoded based on an inner FEC as specified in the preceding header field 706, for example. Chips may be generated based on the symbols based on a spreading factor of 4 times (4×), 16 times (16×) or 64 times (64×), for example. Symbols generated in connection with OFDM, for example, may utilize frequency interleaving and/or spatial interleaving.

Figure 9:
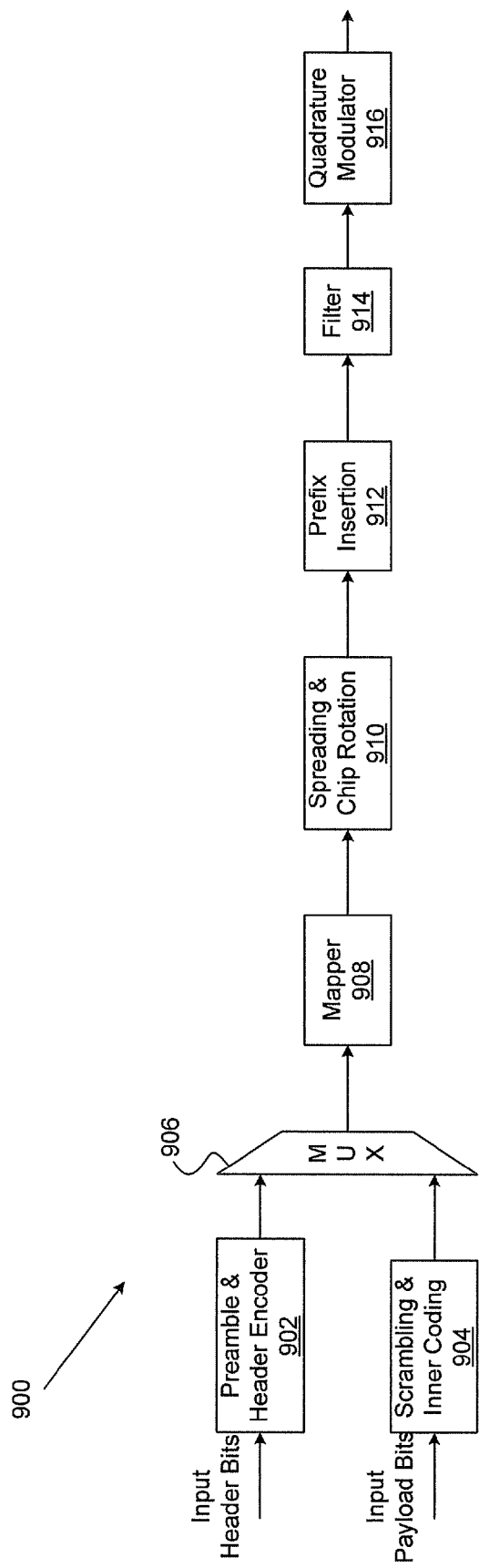
FIG. 9 is a block diagram of an exemplary single mode transmitter, in accordance with an embodiment of the invention.

FIG. 9 is a block diagram of an exemplary single mode transmitter, in accordance with an embodiment of the invention. Referring to FIG. 9, the single mode transmitter 900 may be utilized in a single mode DEV, which utilizes an SCM PHY, for example DEV 114. The single mode transmitter 900 may comprise a preamble and header encoder block 902, a scrambling and inner coding block 904, a multiplexer (MUX) 906, a mapper 908, a spreading and chip rotation block 910, a prefix insertion block 912, a filter block 914 and a quadrature modulator 916.

The preamble and header encoder block 902 may comprise suitable logic, circuitry and/or code that are operable to receive input header bits and generate bits for a short sequence field 702, long sequence field 704 and header field 706. The input header bits may be utilized for generation of bits for the header field 706.

The scrambling and inner coding block 904 may comprise suitable logic, circuitry and/or code that are operable to receive input payload bits and generate bits for a payload field 708. The MUX 906 may comprise suitable logic, circuitry and/or code that are operable to receive input from the preamble and header encoder block 902 and from the scrambling and inner coding block 904 and selectively output bits for the short sequence field 702, long sequence field 704, header field 706 and payload field 708. The mapper 908 is substantially similar to the mapper 802. The mapper 908 may utilize a BPSK modulation type with SCM, a π/2-BPSK modulation type with SCM, a QPSK modulation type with SCM or a π/2-QPSK modulation type with SCM, for example. The spreading and chip rotation block 910 is substantially similar to the chip rotation block 804.

The prefix insertion block 912 may comprise suitable logic, circuitry and/or code that are operable to generate chips for one or more generated guard intervals. The prefix insertion block 912 may insert the generate guard intervals at specified locations within the short sequence field 702, long sequence field 704, header field 706 and/or payload field 708. The filter block 914 is substantially similar to the filter 806. The quadrature modulator 916 is substantially similar to the quadrature modulator 808.

In operation, the preamble and header encoder block 902 may receive input bits for the preamble and/or header portion of a PDU 700. The input bits for the preamble and/or header portion of the PDU 700 may be received from a processor 406 and/or from a memory 408. The preamble and header encoder block 902 may generate a short sequence field 702, long sequence field 704 and/or header 706 as described above. The scrambling and inner coding block 904 may receive input bits for the payload portion of the PDU 700. The input bits for the payload portion of the PDU may be received from a processor 406 and/or from a memory 408. The scrambling and inner coding block 904 may generate a payload field 708 as described above.

The MUX 906 may receive selectively output an input received from the preamble and header encoder block 902 or an input received from the scrambling and inner coding block 904. The MUX 906 may select an input received from the preamble and header encoder block 902 at time instants that correspond to the short sequence 702, long sequence 704 and/or header 706 portions of a PDU 700. The MUX 906 may select an input received from the scrambling and inner coding block 904 at time instants that correspond to the payload 708 portion of a PDU 700. The MUX 906 may make a selection based on a signal from, for example, the processor 406.

The mapper 908 may receive input from the MUX 906 and output symbols as described above. The spreading and chip rotation block 910 may receive symbols from the mapper 906 and output chips as described above. The prefix insertion block 912 may receive chips from the spreading and chip rotation block 910 and insert one or more guard intervals as described above. The filter 914 may filter a signal received from the prefix insertion 912 block and output a filtered signal as described above. The quadrature modulator 916 may receive a filtered signal from the filter 914 and generate signals for transmission as described above. The signals may be transmitted via a transmitting antenna 432, for example.

Figure 10:
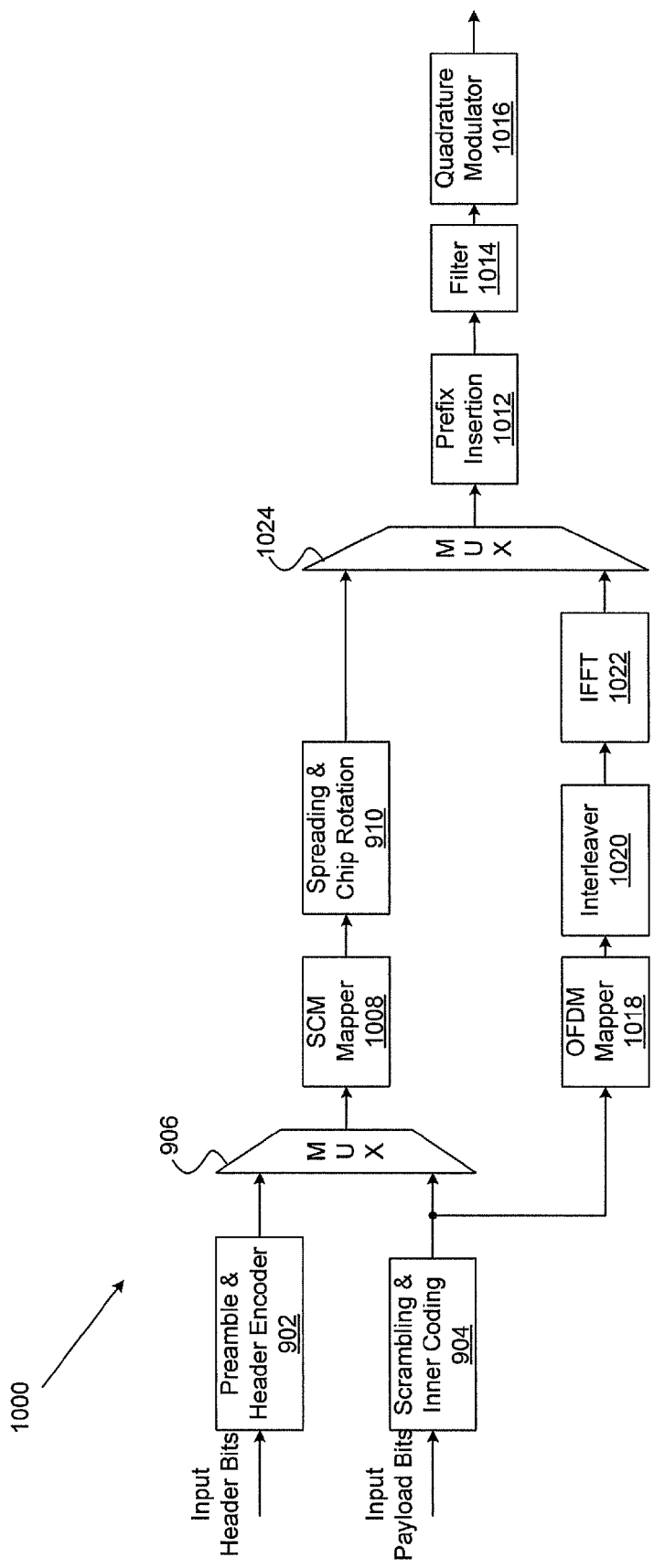
FIG. 10 is a block diagram of an exemplary dual mode transmitter, in accordance with an embodiment of the invention.

FIG. 10 is a block diagram of a dual mode transmitter, in accordance with an embodiment of the invention. Referring to FIG. 10, the dual mode transmitter 1000 may be utilized in a dual mode DEV, which utilizes an SCM PHY and/or an OFDM PHY, for example DEV 112. The dual mode transmitter 1000 may comprise a preamble and header encoder block 902, a scrambling and inner coding block 904, a multiplexer (MUX) 906, an SCM mapper 1008, a spreading and chip rotation block 910, an OFDM mapper 1018, an interleaver 1020, and inverse fast Fourier transform (IFFT) block 1022, a MUX 1024, a prefix insertion block 1012, a filter block 1014 and a quadrature modulator 1016.

The preamble and header encoder block 902, scrambling and inner coding block 904, MUX 906 and spreading and chip rotation block 910 may be substantially as described above for FIG. 9. The prefix insertion block 1012 may be substantially similar to the prefix insertion block 912. The filter block 1014 is substantially similar to the filter block 914. The quadrature modulator block 1016 may be substantially similar to the quadrature modulator block 916. The SCM mapper 1008 may be substantially similar to the SCM mapper 908. The SCM mapper 1008 may utilize a BPSK modulation type with SCM, a π/2-BPSK modulation type with SCM, a QPSK modulation type with SCM or a π/2-QPSK modulation type with SCM, for example.

The OFDM mapper 1018 may include suitable logic, circuitry and/or code that are operable to receive bits from the scrambling and inner coding block 904 and generate symbols. The OFDM mapper 1018 may perform bit interleaving on the bits received from the scrambling and inner coding block 904 prior to generation of the symbols. In connection with the generation of symbols, the OFDM mapper 1018 may utilize a quadrature amplitude modulation (QAM) modulation type with OFDM, for example. The OFDM mapper 1018 may be operable to generate individual symbols in an order that associates the individual symbols with one or more carrier frequencies selected from within an OFDM channel bandwidth.

The interleaver 1020 may comprise suitable logic, circuitry and/or code that are operable to perform frequency and/or spatial interleaving on symbols received from the OFDM mapper 1018. The interleaver 1020 may be operable to rearrange the order of the symbols received from the OFDM mapper 1018.

The IFFT 1022 block may comprise suitable logic, circuitry and/or code that may be operable to receive a frequency domain representation of symbols from the interleaver 1020 and generate a time domain representation of the symbols.

The MUX 1024 may comprise suitable logic, circuitry and/or code that may enable the MUX 1024 to receive input from the spreading and chip rotation block 910 and the IFFT block 1022. The MUX 1024 may enable the dual mode transmitter 1000 to transmit signals utilizing an SCM PHY by selectively outputting a signal, which is input from the spreading and chip rotation block 910. The MUX 1024 may enable the dual mode transmitter 1000 to transmit signals utilizing an OFDM PHY by selectively outputting a signal, which is input from the IFFT block 1022.

In operation, the preamble and header encoder block 902 may receive input bits for the preamble and/or header portion of a PDU 700. The input bits for the preamble and/or header portion of the PDU 700 may be received from a processor 406 and/or from a memory 408. The preamble and header encoder block 902 may generate a short sequence field 702, long sequence field 704 and/or header 706 as described above. The scrambling and inner coding block 904 may receive input bits for the payload portion of the PDU 700. The input bits for the payload portion of the PDU may be received from a processor 406 and/or from a memory 408. The scrambling and inner coding block 904 may generate a payload field 708 as described above.

The MUX 906 may receive selectively output an input received from the preamble and header encoder block 902 or an input received from the scrambling and inner coding block 904. The MUX 906 may select an input received from the preamble and header encoder block 902 at time instants that correspond to the short sequence 702, long sequence 704 and/or header 706 portions of a PDU 700. The MUX 906 may select an input received from the scrambling and inner coding block 904 at time instants that correspond to the payload 708 portion of a PDU 700. The MUX 906 may make a selection based on a signal from, for example, the processor 406.

The SCM mapper 1008 may receive input from the MUX 906 and output symbols as described above. The spreading and chip rotation block 910 may receive symbols from the SCM mapper 1006 and output chips as described above. The OFDM mapper 1018 may receive input from the scrambling and inner coding block 904 and output symbols as described above. The interleaver 1020 may receive symbols in a frequency sequence from the ODFM mapper 1018 and output a frequency domain signal after rearranging the frequency sequence order of the symbols received from the OFDM mapper 1018 as described above. The IFFT 1022 may receive the frequency domain signal output from the interleaver 1020 and generate a time domain signal as described above.

The MUX 1024 may selectively output an input received from the spreading and chip rotation block 910 or an input received from the IFFT block 1022. The MUX 1024 may make a selection based on a signal from, for example, the processor 406. The prefix insertion block 1012 may receive an input signal from the MUX 1024 and insert one or more guard intervals as described above. The filter 1014 may filter a signal received from the prefix insertion 1012 block and output a filtered signal as described above. The quadrature modulator 1016 may receive a filtered signal from the filter 1014 and generate signals for transmission as described above.

Figure 11:
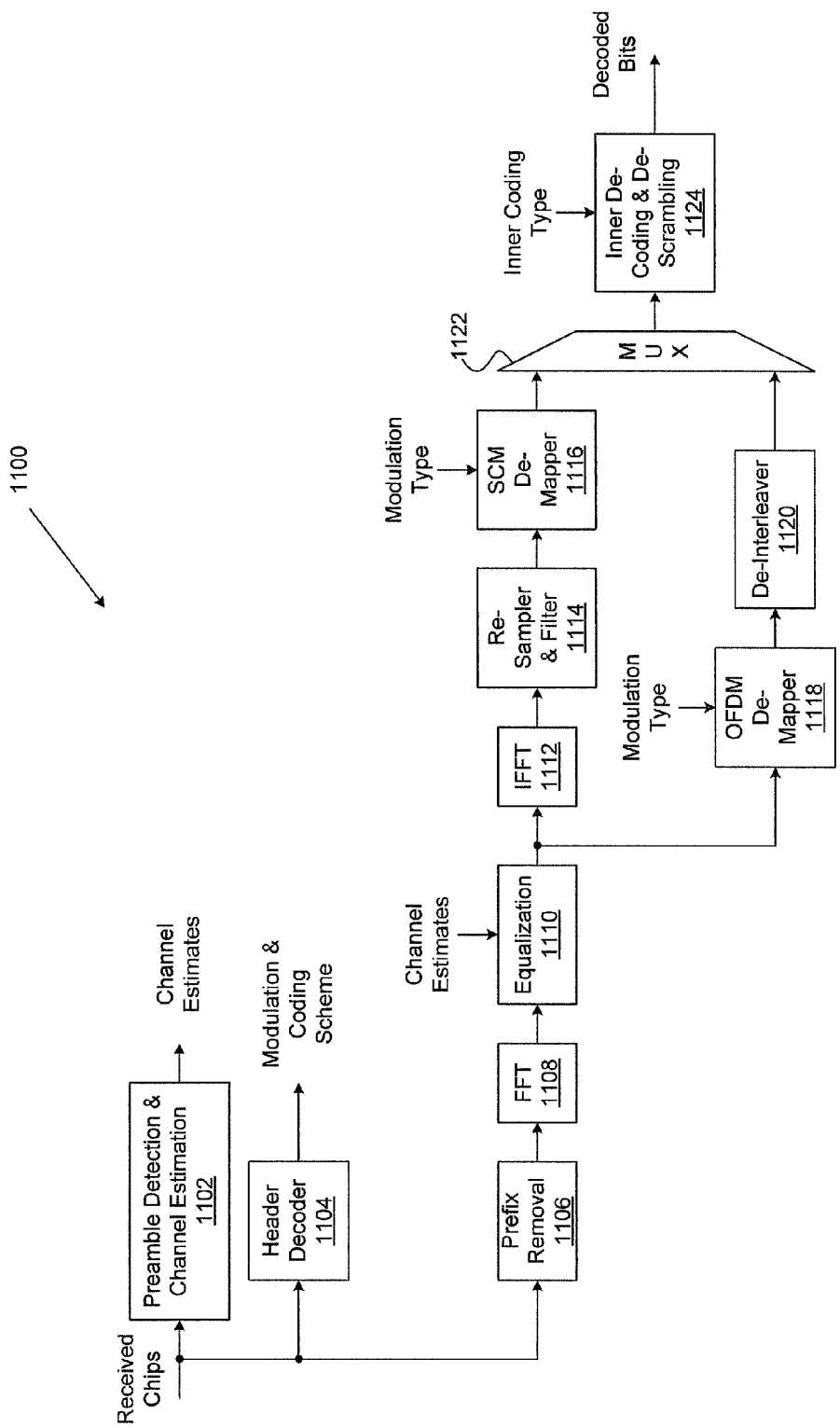
FIG. 11 is a block diagram of an exemplary dual mode receiver, in accordance with an embodiment of the invention.

FIG. 11 is a block diagram of an exemplary dual mode receiver, in accordance with an embodiment of the invention. Referring to FIG. 11, the dual mode receiver 1100 may be utilized in a dual mode DEV, which utilizes an SCM PHY and/or an OFDM PHY, for example DEV 112. The dual mode receiver 1100 may comprise a preamble detection and channel estimation block 1102, a header decoder block 1104, a prefix removal block 1106, a fast Fourier transform (FFT) block 1108, an equalization block 1110, an IFFT block 1112, and a re-sampler and filter block 1114. The dual mode receiver 1100 may also comprise an SCM de-mapper block 116, an OFDM de-mapper block 1118, a de-interleaver block 1120, a MUX 1122 and an inner de-coding and de-scrambling block 1124. The IFFT block 112 is substantially similar to the IFFT block 1022.

The preamble detection and channel estimation block 1102 may comprise suitable logic, circuitry and/or code that are operable to receive and process chips from the short sequence field 702 and long sequence field 704 portions of a PDU 700. During processing of the short sequence field and/or long sequence field 704, the preamble detection and channel estimation block 1102 may compute channel estimate values $\hat{h}_n$.

The header decoder block 1104 may comprise suitable logic, circuitry and/or code that are operable to receive and process chips from the header field 706 portion of a PDU 700. During processing of the header field, the header decoding block 1104 may determine a modulation type and inner coding type, which are to be utilized during processing of the payload field 708 portion of the PDU 700.

The prefix removal block 1106 may comprise suitable logic, circuitry and/or code that are operable to remove guard intervals that were inserted into the PDU 700 by the prefix insertion block 1012 at a transmitter 1000.

The FFT 1108 may comprise suitable logic, circuitry and/or code that are operable to receive a time domain signal and generate a frequency domain representation of the received signal. The frequency domain representation of the received signal may enable identification of each carrier frequency component within the received time domain signal. The FFT 1108 may also be operable to perform despreading of chips in the received time domain signal such that the frequency domain representation of the received signal comprises symbols.

The equalization block 1110 may comprise suitable logic, circuitry and/or code that are operable to generate output signals that comprise adjusted signal levels from the received signal. The equalization block 1110 may be operable to adjust signal levels to compensate for fading. The compensation may be referred to as signal equalization. The equalization block 1110 may utilize computed channel estimates, $\hat{h}_n$, during signal equalization.

The re-sampler and filter block 1114 may comprise suitable logic, circuitry and/or code that are operable to sample a time domain signal at a determined sampling rate. The sampled signal may be filtered in a manner, which may be substantially similar to that described for the filter 806. As an example, the determined sampling rate may be equal to $3/(2*T)$, where T refers to a symbol time duration.

The SCM de-mapper block 1116 may comprise suitable logic, circuitry and/or code that are operable to receive individual symbols and generate one or more bits from each received symbol. The SCM de-mapper block 1116 may be operable to receive an input that identifies a modulation type. The modulation type may enable the SCM de-mapper block 1116 to select a constellation map. Upon receipt of each symbol, the SCM de-mapper 1116 may identify a corresponding point in the constellation map and generate the corresponding bits. The SCM de-mapper 1116 may receive symbols from a signal, which comprises a single carrier frequency.

The OFDM de-mapper block 1118 may receive symbols from a plurality of carrier frequencies. The OFDM de-mapper block 1118 may distinctly identify each of the plurality of carrier frequencies. The OFDM de-mapper block 1118 may be operable to process symbols from each of the individual carrier frequencies in a manner, which is substantially similar to that described for the SCM de-mapper block 1116. The order in which the OFDM de-mapper block 1118 may process symbols from each of the plurality of carriers may be determined in response to frequency interleaving, which may have been performed at the transmitter 1000.

The de-interleaver block 1120 may comprise suitable logic, circuitry and/or code that are operable to rearrange the order of bits received from the OFDM de-mapper block 1118. The order of the rearrangement of bits may be determined in response to bit interleaving, which may have been performed at the transmitter 1000.

The MUX 1122 may comprise suitable logic, circuitry and/or code that may enable the MUX 1122 to receive input from the SCM de-mapper block 1116 and the de-interleaver block 1120. The MUX 1122 may enable the dual mode receiver 1100 to receive signals utilizing an SCM PHY by selectively outputting a signal, which is input from the SCM de-mapper block 1116. The MUX 1122 may enable the dual mode receiver 1100 to receive signals utilizing an OFDM PHY by selectively outputting a signal, which is input from the de-interleaver block 1120.

The inner de-coding and descrambling block 1124 may comprise suitable logic, circuitry and/or code that are operable to decode and descramble received bits and generate decoded bits. The inner de-coding and descrambling block 1124 may receive an inner coding type identifier as input, which may be utilized to select an inner FEC type. The selected inner FEC type may be utilized during processing of the received bits.

In operation, the prefix removal block 1106 may receive chips as described above and output a time domain signal. The FFT block 1108 may receive the time domain signal from the prefix removal block 1106 and output a frequency domain representation of the time domain signal. The equalization block 1110 may receive the frequency domain signal from the FFT block 1108 and output an equalized signal by performing signal equalization as described above. The IFFT 1112 may receive the equalized signal from the equalization block 1110 and output a time domain representation of the equalized signal. The re-sampler and filter block 1114 may receive the time domain signal output from the IFFT 1112 block and output a resampled signal. The resampled signal may also be filtered. The resampled signal may comprise a symbol for each sample in a time sequence. The SCM de-mapper 1116 may receive the resampled signal from the re-sampler and filter block 1114 and generate bits as described above.

The OFDM de-mapper 1118 may receive the equalized signal from the equalization block 1110 and output bits as described above. The de-interleaver block 1120 may receive bits from the OFDM de-mapper 1118 and generate rearranged bits as described above. The MUX 1122 may select bits from the SCM de-mapper block 1116 or from the de-interleaver block 1120. The selected bits may be output from the MUX 1122. The MUX 1122 may make a selection based on a signal from, for example, the processor 406. The inner de-coding and de-scrambling block 1124 may receive bits from the MUX 1122 and generate decoded bits as described above.

Figure 12:
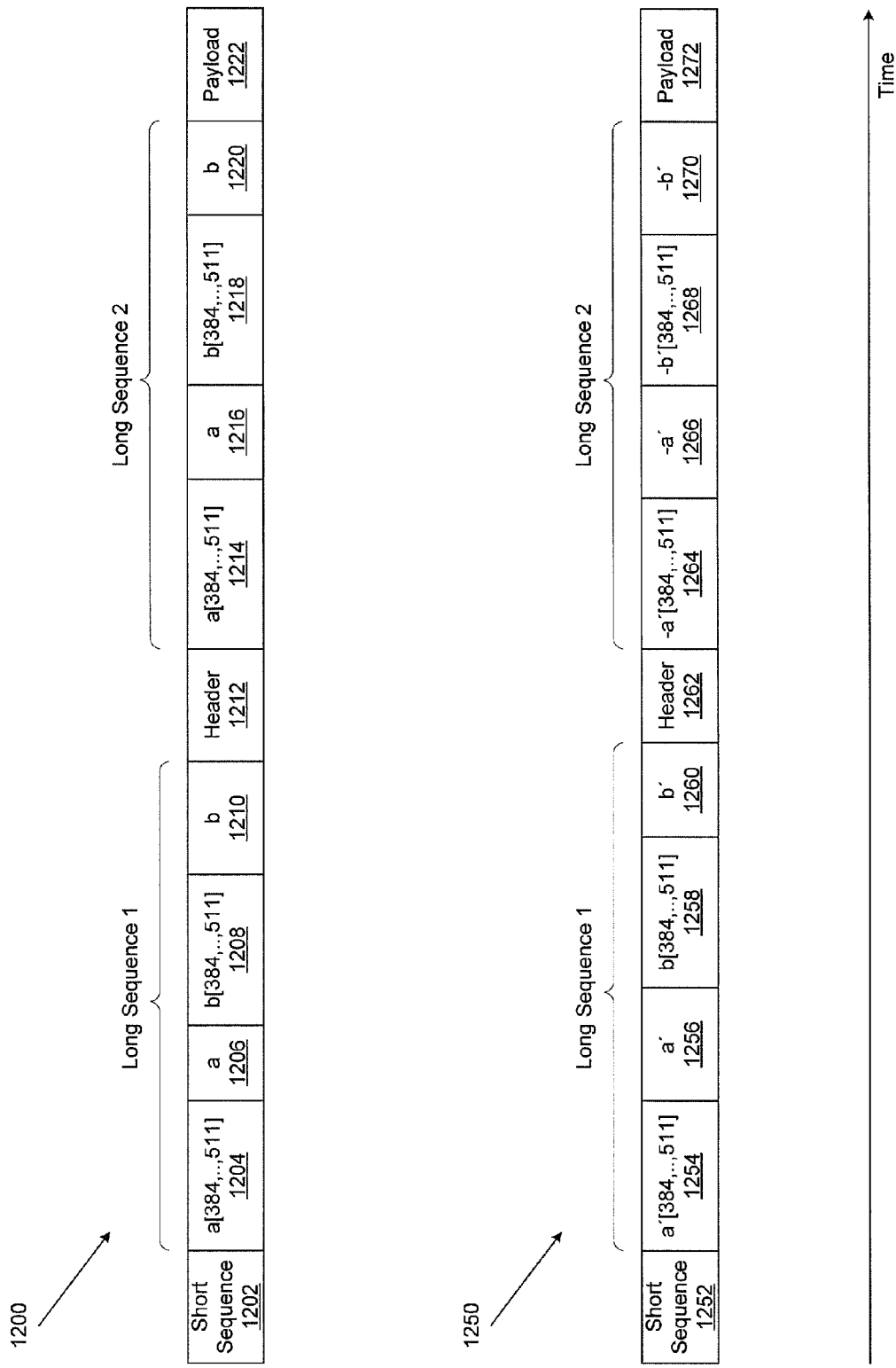
FIG. 12 is a block diagram illustrating exemplary preambles for MIMO operation, in accordance with an embodiment of the invention.

FIG. 12 is an illustration of exemplary preambles for MIMO operation, in accordance with an embodiment of the invention. FIG. 12 presents an exemplary illustration of long sequence generation from a transmitter 404, which utilizes a plurality of transmitting antennas 432 to concurrently transmit signals. Referring to FIG. 12, there is shown an exemplary PDU 1200, which is transmitted by a first antenna in a MIMO transmitter, and an exemplary PDU 1260, which is transmitted by a second antenna in a MIMO transmitter.

The PDU 1200 may comprise a short sequence field 1202, a guard interval a (Guard_a) 1204, a Golay code sequence a (Seq_a) 1206, a guard interval b (Guard_b) 1208, a Golay code sequence b (Seq_b) 1210, a header field 1212, a Guard_a 1214, a Seq_a 1216, a Guard_b 1218, a Seq_b 1220 and a payload field 1222. The PDU 1250 may comprise a short sequence field 1252, a cyclically shifted, Guard_a, Guard_a' 1254, a cyclically shifted Seq_a, Seq_a' 1256, a cyclically shifted Guard_b, Guard_b' 1258, a cyclically shifted Seq_b, Seq_b' 1260, a header field 1262, a cyclically shifted complement Guard_a', Guard_-a' 1264, a cyclically shifted complement Seq_a', Seq_-a' 1266, a cyclically shifted complement Guard_b', Guard_-b' 1268, a cyclically shifted complement Seq_b', Seq_-b' 1270 and a payload field 1272.

The cyclically shifted Guard_a' 1254 may represent a cyclically shifted version of Guard_a 1204, the cyclically shifted Seq_a' 1256 may represent a cyclically shifted version of Seq_a 1206, the cyclically shifted Guard_b' 1258 may represent a cyclically shifted version of Guard_b 1208 and the cyclically shifted Seq_b' 1260 may represent a cyclically shifted version of Seq_b 1210.

The cyclically shifted complement Guard_-a' 1264 may represent a binary complement version of Guard_a' 1254, the cyclically shifted complement Seq_-a' 1266 may represent a binary complement version of Seq_a' 1256, the cyclically shifted complement Guard_b' 1268 may represent a binary complement version of Guard_b' 1258 and the cyclically shifted complement Seq_-b' 1270 may represent a binary complement version of Seq_b' 1260.

Further aspects include low rate OFDM encoding. Encoding of the OFDM symbols may utilize a subset of carriers available in an OFDM channel bandwidth. Utilizing a 512-point FFT and IFFT, thirty-two carriers may be utilized. BPSK values may be assigned to each of the thirty-two carriers based on a Golay code sequence, which is selected from a plurality of Golay code sequences. The Golay code sequences among the plurality of Golay code sequences may be maximally separated. For example, the plurality may comprise 256 Golay code sequences, each of which comprises a 32-chip sequence. A spreading factor of 4 may be utilized; thus each 32-chip sequence may correspond to 8-bits. Consequently, each OFDM symbol may correspond to 8 encoded bits. The encoded bits may represent encoded bits, which were generated by utilizing a selected inner FEC type, for example a coding rate ½ LDPC or coding rate ¾ LDPC.

Figure 13:
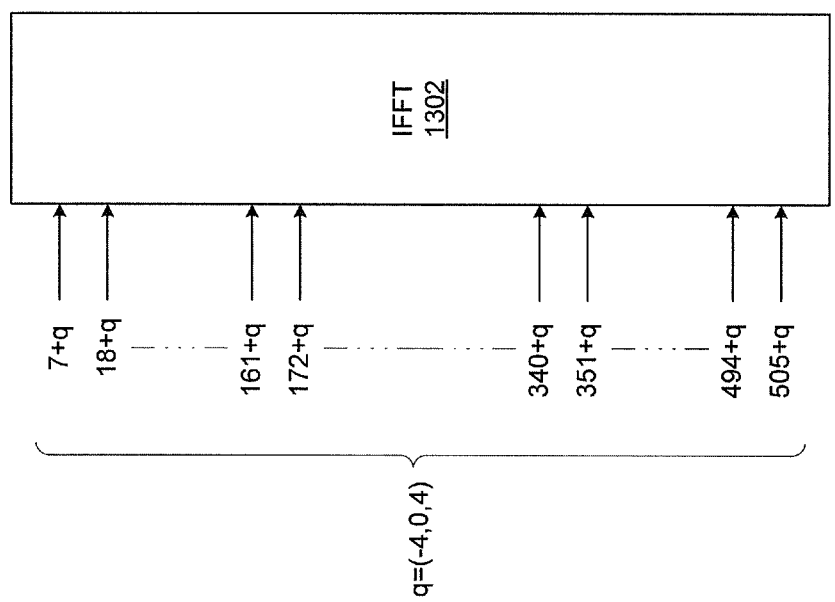
FIG. 13 is a block diagram of an exemplary IFFT algorithm for low rate OFDM encoding, in accordance with an embodiment of the invention.

FIG. 13 is a block diagram of an exemplary IFFT algorithm for low rate OFDM encoding, in accordance with an embodiment of the invention. Referring to FIG. 13, an OFDM symbol may be generated by a 512-point IFFT block 1302, by utilizing a subset of the taps available in the IFFT block 1302. Each of the taps may correspond to a frequency carrier, which is utilized for transmission of bits in an OFDM symbol. As shown in FIG. 13, there may be a spacing of 11 taps between selected frequency carriers. An offset value, q, may be utilized to enable a plurality of piconets to concurrently generate OFDM symbols while reducing the likelihood that OFDM symbols transmitted within one piconet will interference with transmission of OFDM symbols in a nearby, or overlapping, piconet. Potential values of the offset value, q, may be −4, 0 and 4. For example, a parent piconet 222 may utilize low-rate OFDM encoding of symbols by utilizing an offset value of −4, while a nearby piconet may concurrently practice low-rate OFDM encoding of symbols by utilizing an offset value of 4.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (for example, an item includes, but is not limited to, a component, an element, a circuit, and/or a module) where, for indirect coupling, the intervening item does not modify the information of a signal but may adjust its current level, voltage level, and/or power level. As may further be used herein, inferred coupling (that is, where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with, includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention may also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A method for communicating data in a wireless personal area network (WPAN), the method comprising:
    processing received radio frequency (RF) signals based on a selected physical layer type to produce processed signals;
    determining, based on the processed signals, whether a beacon protocol data unit has been detected; and
    when the beacon protocol data unit has not been detected:
        determining a signal energy level for the received RF signals via the processed signals when a protocol data unit has not been detected; and
        transmitting an originating beacon protocol data unit based on the determined signal energy level.

2. The method of claim 1, further comprising:
    when the beacon protocol data unit has been detected, establishing an association with an existing network.

3. The method of claim 2, wherein the establishing the association with the existing network further comprising:
    communicating with a coordinating communication device associated with the existing network.

4. The method of claim 1, wherein the processing the received RF signals further comprising:
    processing the received RF signals based on a subsequent physical layer type to produce the processed signals.

5. The method of claim 4, wherein the subsequent physical layer type comprising:
    a single carrier modulation physical layer when the selected physical layer type includes an orthogonal frequency division multiplexing physical layer.

6. The method of claim 4, wherein the processing of the received RF signals utilizes stored information that is known about the subsequent physical layer type.

7. The method of claim 4, further comprising:
    determining whether the protocol data unit has been detected based on the processed signals that are produced based on the subsequent physical layer type.

8. The method of claim 7, further comprising:
    selecting a RF channel based on at least one of the determined signal energy level and the detection of the protocol data unit based on the received RF signals that are processed based on the subsequent physical layer type.

9. The method of claim 1, further comprising:
    starting a time duration at the start of the processing of the received RF signals.

10. The method of claim 1, further comprising:
    transmitting the originating beacon protocol data unit, via a selected RF channel or via a selected subsequent RF channel, subsequent to expiration of the time duration.

11. A terminal device for communicating data in a network, the terminal device comprising:
    a processor; and
    memory operably coupled to the processor, wherein the memory stores operational instructions that cause the processor to:
        select a physical layer type;
        process received signals to produce processed signals based on the selected physical layer type;
        determine, based on the processed signals, whether a beacon protocol data unit is detected;
        when the beacon protocol data unit is not detected:
            determine a signal energy level for the received signals based on the processed signals when a protocol data unit has not been detected; and
            transmit an originating beacon protocol data unit based on the determined signal energy level.

12. The terminal device of claim 11, wherein the memory further comprises operational instructions that cause the processor to:
    when the beacon protocol data unit has been detected, establish an association with an existing network.

13. The terminal device of claim 12, wherein the memory further comprises operational instructions that cause the processor to establish the association by:
    communicating with a coordinating communication device that is associated with the existing network.

14. The terminal device of claim 11, wherein the selected physical layer type comprises at least one of:
    a single carrier modulation physical layer; and
    an orthogonal frequency division multiplexing physical layer.

15. The terminal device of claim 11, wherein the memory further comprises operational instructions that cause the processor to:
    start a time duration at the start of the processing of the received signals.

16. The terminal device of claim 15, wherein the memory further comprises operational instructions that cause the processor to:
    transmit the originating beacon protocol data unit, via at least one of a selected radio frequency (RF) channel and a selected subsequent RF channel, subsequent to expiration of the time duration.

17. A method in a transceiver for communicating data in a wireless local area network, the method comprising:
    selecting a physical layer type;
    processing received radio frequency (RF) signals to produce processed signals based on the selected physical layer type;
    determining, based on the processed signals, whether a beacon protocol data unit has been detected; and
    when the beacon protocol data unit has not been detected:
        determining a signal energy level for the received RF signals based on the processed signals when a protocol data unit has not been detected; and
        transmitting, via a transmitter, an originating beacon protocol data unit based on the determined signal energy level.

18. The method of claim 17, further comprising:
when the beacon protocol data unit has been detected, establishing an association with an existing network.

19. The method of claim 18, wherein the establishing the association with the existing network further comprising:
communicating with a coordinating communication device associated with the existing network.

20. The method of claim 17, wherein the selected physical layer type comprises at least one of:
a single carrier modulation physical layer; and
an orthogonal frequency division multiplexing physical layer.

* * * * *